United States Patent
Jubb et al.

[11] Patent Number: 5,994,247
[45] Date of Patent: Nov. 30, 1999

[54] SALINE SOLUBLE INORGANIC FIBRES

[75] Inventors: Gary Anthony Jubb, Worcestershire, United Kingdom; Jean-Louis Martin, Montbrison, France

[73] Assignee: The Morgan Crucible Company plc, Berkshire, United Kingdom

[21] Appl. No.: 08/899,005

[22] Filed: Jul. 23, 1997

Related U.S. Application Data

[62] Continuation of application No. 08/535,587, Sep. 28, 1995, abandoned, which is a continuation of application No. 08/039,086, filed as application No. PCT/GB93/00085, Jan. 15, 1993, abandoned.

[30] Foreign Application Priority Data

Jan. 17, 1992 [GB] United Kingdom .................. 9200993
Nov. 24, 1992 [GB] United Kingdom .................. 9224612

[51] Int. Cl.$^6$ .................................................. C03C 13/06
[52] U.S. Cl. .................................. 501/36; 501/8; 501/35; 501/38
[58] Field of Search ................................ 501/35, 36, 38, 501/8, 65

[56] References Cited

U.S. PATENT DOCUMENTS

| | | |
|---|---|---|
| 2,051,279 | 8/1936 | Thorndyke . |
| 2,116,303 | 5/1938 | Coss . |
| 2,155,107 | 4/1939 | Tyler et al. ............................ 106/36.3 |
| 2,308,857 | 1/1943 | Bowes ...................................... 106/50 |
| 2,428,810 | 10/1947 | Powell ...................................... 18/2.6 |
| 2,520,168 | 8/1950 | Powell ...................................... 18/2.6 |
| 2,520,169 | 8/1950 | Powell ...................................... 18/2.6 |
| 2,576,312 | 11/1951 | Minnick .................................... 106/50 |
| 2,577,431 | 12/1951 | Powell ...................................... 18/2.6 |
| 2,823,416 | 2/1958 | Powell ...................................... 18/2.6 |

(List continued on next page.)

FOREIGN PATENT DOCUMENTS

| | | |
|---|---|---|
| 255803 | 7/1963 | Australia . |
| 588493 | 12/1959 | Canada . |
| 2017344 | 11/1990 | Canada . |
| 0019600 | 11/1980 | European Pat. Off. . |
| 0076677 | 4/1983 | European Pat. Off. . |
| 0091866 | 10/1983 | European Pat. Off. . |
| 0135449 | 3/1985 | European Pat. Off. . |
| 0 144 349 | 6/1985 | European Pat. Off. . |
| 917045 | 5/1989 | European Pat. Off. . |
| 0399320 | 11/1990 | European Pat. Off. . |

(List continued on next page.)

OTHER PUBLICATIONS

"Advertisement for the Sale of a Fiber Glass Blanket Under the Name *New Super Wool*™," published after Sep. 1986 on or about Jan. 1987.

"The Dissolution of Asbestos Fibres in Water," Gronow, J., *Clay Minerals*, vol. 22, pp. 21–35 (1987).

"Man–Made Vitreous Fibers: An Overview of Studies on Their Biologic Effects," Gross, P., *Am. Ind. Hyg. Assoc. J.*, vol. 47, No. 11, 717–723 (1986).

"Solubility of Asbestos and Man–Made Fibers In Vitro and In Vivo: Its Significance in Lung Disease," Morgan, A., et al., *Environmental Research*, vol. 39, pp. 475–484 (1986).

"Corrosion Phenomena in Glass Fibers and Glass Fiber Reinforced Thermosetting Resins," Bledzki, A. et al., *Composites Science & Technology*, Harris and Chou, eds., Elsevier Applied Science Publishers, vol. 23, pp. 263–285 (1985).

(List continued on next page.)

*Primary Examiner*—Karl Group
*Attorney, Agent, or Firm*—Kilpatrick Stockton LLP; Dean W. Russell, Esq.; Bruce D. Gray, Esq.

[57] ABSTRACT

Disclosed is use of a vitreous inorganic fiber in the knowledge that it has a composition meeting the criterion that the calculated sum of the free energies of hydration of the compounds that would or could be present at equilibrium (on the basis of knowledge, informed belief or reasonable assumption) is more negative than –10 kcal/100 grams of composition. Such compositions are saline soluble.

9 Claims, 3 Drawing Sheets

U.S. PATENT DOCUMENTS

| | | | |
|---|---|---|---|
| 3,348,956 | 10/1967 | Ekdahl | 106/65 |
| 3,449,137 | 6/1969 | Ekdahl | 106/50 |
| 3,799,836 | 3/1974 | Rogers et al. | 501/8 |
| 3,887,386 | 6/1975 | Majumdar | 106/99 |
| 4,036,654 | 7/1977 | Yale et al. | 106/52 |
| 4,054,472 | 10/1977 | Kondo et al. . | |
| 4,055,434 | 10/1977 | Chen et al. | 106/50 |
| 4,153,439 | 5/1979 | Tomic et al. | 65/2 |
| 4,205,992 | 6/1980 | Mogensen et al. | 106/50 |
| 4,238,213 | 12/1980 | Pallo et al. | 65/8 |
| 4,251,279 | 2/1981 | Ekdahl | 106/50 |
| 4,274,881 | 6/1981 | Langton et al. | 106/98 |
| 4,325,724 | 4/1982 | Froberg . | |
| 4,342,581 | 8/1982 | Neubauer et al. | 65/4.4 |
| 4,351,054 | 9/1982 | Olds | 373/38 |
| 4,366,251 | 12/1982 | Rapp | 501/36 |
| 4,377,415 | 3/1983 | Johnson et al. | 106/90 |
| 4,437,192 | 3/1984 | Fujiu et al. | 3/1.9 |
| 4,443,550 | 4/1984 | Kume et al. | 501/65 |
| 4,482,541 | 11/1984 | Telfer et al. | 424/128 |
| 4,555,492 | 11/1985 | Ekdahl et al. | 501/38 |
| 4,615,988 | 10/1986 | Le Moigne et al. . | |
| 4,661,134 | 4/1987 | Hartung | 65/6 |
| 4,678,659 | 7/1987 | Drake et al. | 424/451 |
| 4,693,740 | 9/1987 | Noiret et al. | 65/135 |
| 4,957,559 | 9/1990 | Tiesler et al. | 106/170 |
| 5,023,552 | 6/1991 | Nonami et al. | 501/95 |
| 5,055,428 | 10/1991 | Porter | 501/35 |
| 5,108,957 | 4/1992 | Cohen et al. | 501/35 |
| 5,121,748 | 6/1992 | Ditz et al. | 128/631 |
| 5,217,529 | 6/1993 | Tiesler et al. | 106/170 |
| 5,248,637 | 9/1993 | Taneda et al. . | |
| 5,250,488 | 10/1993 | Thelohan et al. | 501/36 |
| 5,312,806 | 5/1994 | Mogensen . | |
| 5,332,699 | 7/1994 | Olds et al. | 501/36 |
| 5,401,693 | 3/1995 | Bauer et al. | 501/36 |
| 5,583,080 | 12/1996 | Guldberg et al. | 501/36 |
| 5,691,255 | 11/1997 | Jensen et al. | 501/36 |

FOREIGN PATENT DOCUMENTS

| | | |
|---|---|---|
| 399652 | 11/1990 | European Pat. Off. . |
| 0412878 | 2/1991 | European Pat. Off. . |
| 0459897 | 12/1991 | European Pat. Off. . |
| 546984 | 6/1993 | European Pat. Off. . |
| 0585547 | 3/1994 | European Pat. Off. . |
| 0586797 | 3/1994 | European Pat. Off. . |
| 0588251 | 3/1994 | European Pat. Off. . |
| 0591696 | 4/1994 | European Pat. Off. . |
| 63007 | 12/1982 | Finland . |
| 1149289 | 12/1957 | France . |
| 1165275 | 10/1958 | France . |
| 1589410 | 5/1970 | France . |
| 2118026 | 7/1972 | France . |
| 2662687 | 12/1991 | France . |
| 2662688 | 12/1991 | France . |
| 1942991 | 3/1970 | Germany . |
| 2748127 | 5/1978 | Germany . |
| 2732387 | 11/1978 | Germany . |
| 3444397 | 6/1986 | Germany . |
| 3905394 | 9/1989 | Germany . |
| 49-27620 | 3/1974 | Japan . |
| 51-13819 | 2/1976 | Japan . |
| 51-133311 | 11/1976 | Japan . |
| 52-4519 | 1/1977 | Japan . |
| 56-54252 | 5/1981 | Japan . |
| 104380 | 4/1942 | Sweden . |
| 276349 | 7/1970 | U.S.S.R. . |
| 607807 | 5/1978 | U.S.S.R. . |
| 520247 | 4/1939 | United Kingdom . |
| 790397 | 2/1958 | United Kingdom . |
| 810773 | 3/1959 | United Kingdom . |
| 1209244 | 10/1970 | United Kingdom . |
| 1273205 | 5/1972 | United Kingdom . |
| 1446910 | 8/1976 | United Kingdom . |
| 2011379 | 7/1979 | United Kingdom . |
| 2081703 | 2/1982 | United Kingdom . |
| 2083017 | 3/1982 | United Kingdom . |
| 2122537 | 1/1984 | United Kingdom . |
| 2150553 | 7/1985 | United Kingdom . |
| 2164557 | 3/1986 | United Kingdom . |
| WO 85/02394 | 6/1985 | WIPO . |
| WO 86/04807 | 8/1986 | WIPO . |
| WO 87/05007 | 8/1987 | WIPO . |
| WO 89/12032 | 12/1987 | WIPO . |
| WO 90/02713 | 3/1990 | WIPO . |
| WO 90/11756 | 10/1990 | WIPO . |
| WO 91/11403 | of 1991 | WIPO . |
| WO 92/07801 | 5/1992 | WIPO . |
| WO 92/09536 | 6/1992 | WIPO . |
| WO 93/19596 | 10/1993 | WIPO . |
| WO 93/22251 | 11/1993 | WIPO . |
| WO 94/14717 | 7/1994 | WIPO . |
| WO 94/14718 | 7/1994 | WIPO . |

OTHER PUBLICATIONS

"Fiber Toxicology," Leineweber, J.P., *J. Occupational Medicine*, vol. 23, No. 6, pp. 431–434 (1981).

"Effects of Glass Surface Area to Solution Volume Ration on Glass Corrosion," Ethridge, E.C. et al., *Physics and Chemistry of Glasses*, vol. 20, No. 2, pp. 35–40 (1979).

"Glass Compositions for Glass Fibers," Moriya, Ichiro, et al., *Chemical Abstracts*, vol. 89, No. 22, p. 28, Abstract 184615W (1978).

"Glass for Making Glass Fiber," Grigor'ev, V.S., et al., *Chemical Abstracts*, vol. 81, No. 22, Abstract 140076b (1974).

"Dissolution Kinetics of Magnesium Silicates," Luce, R.W., et al., *Geochimica et Cosmochimica Acta.*, vol. 36, pp. 35–50 (1972).

H. Ohta and Y. Suzuki, Chemical Durability of Glasses in the Systems $SiO_2$—CaO—$Na_2O$—$R_mO_n$, Ceramic Bulletin, vol. 57, No. 6 pp. 602–604 (1978).

J. Mohr and W. Rowe, *Fiber Glass*, pp. 4–23. No date.

Database WPII Section Ch, Week 8218, Class I AN 82–36551F (Oct. 1975).

"Multicomponent Silicate Glasses", *Molecular Structure*, pp. 28–31 no date.

"The behaviour of mineral fibres in physiological solutions", H. Förster Proceedings of 1982 WHO IARC Conference, Copenhagen, vol. 2, pp. 27–55 (1988).

Chemical Abstracts vol. 110 No. 10, abstract No. 81274g p. 373 (1989) (equivalent to CN–A–87 108257).

"The reactions of MMMF in a physiological model fluid and in water" R. Klingholz & B. Steinkopf Proceedings of 1982 WHO IARC Conference, Copenhagen, vol. 2, pp. 61–86 (1988).

"Solubility of fibres in vitro and in vivo" J.P. Leinweber Proceedings of 1982 WHO IARC Conference, Copenhagen, vol. 2, pp. 87–101 (1988).

"In vitro study on siliceous fibres" H. Scholze & R. Conradt Proceedings of WHO IARC Conference.

"An in vitro Study of the Chemical Durability of Siliceous Fibres" H. Scholze & R. Conradt Annals of Occupational Hygiene 31,4B(1987) 683–692.

"Chemical Durability of asbestos and of man–made mineral fibres in vivo" B. Bellman et al. Aerosol Scientist Vo. 17 No. 3 pp. 341–345, 1986.

5,994,247
Page 3

Brochure showing Manville Corporation Superwool product (two pages) no date.

Brochure showing Morgan Crucible Company Superwood product (two pages) no date.

Brochures showing Carborundum Company Insulfrax product (sixteen pages) no date.

"A scale of acidity and basicity in glass"—Glass Industry, Kuan–Han Sun 1948.

"Encyclopedia of Chemical Technology" Kirk & Othmer vol. 9 p. 124 "Mineral Wool" (copyright 1952).

US Bureau of Mines Circular "Mineral Wool" I.C. 6984R dated Jun. 1939.

"Slag Wools" pp. 111–127 no date.

"Chemical Durability" Chapter 34 of Glass Science and Technology, Elsevier, 1988.

"Thermodynamic model of natural, medieval and nuclear waste glass durability" C.M. Jantzen & M.J. Plodinec Journal of Non–Crystalline Solids 67(1984) 208–233.

"Stability of Radioactive Waste Glasses Assessed from Hydration Thermodynamics" M.J. Plodinec, C.M. Jantzen, & G.G. Wicks no date.

Nuclear Waste Glass Durability: 1, Predicting Environmental Response from thermodynamic (Pourbaix) Diagrams Carol M. Jantzen Journal of American Ceramic Society 75[9](1992) 2433–48.

"Prediction of Nuclear waste Glass Durability from Natural Analogs" C.M. Jantzen Advances in Ceramics vol. 20: Nuclear Waste Management II (1986).

"Prediction of Glass Durability as a Function of Glass Composition and test Conditions: Thermodynamics and Kinetics" C.M. Jantzen Advances in the Fusion of Glass 24.1–24.17 no date.

"A new approach to predicting the durability of glasses from their chemical compositions" R.G. Newton & A. Paul Glass Technology 21[6](1980) 307–309.

"Glass–water interactions" H. Scholze Journal of Non–Crystalline Solids 102(1988) 1–10.

"Chemical durability of Glass" Chapter 6 from "Chemistry of Glasses" 2nd edition A. Paul 1990.

Brochure re PARGAS–Platten 1000° C mineral wool plates (three pages) no date.

"Inviscid spinning of Filaments via Chemical Jet Stabilization" R.E. Cunningham, L.F. Rakestraw & S.A. Dunn American Institute of Chemical Engineers Symposium Series No. 180 vol. 74,20–31 (1978).

"Low–cost Reinforcing Fibres Promise a High Level of Performance" S.A. Dunn, Modern Plastics International, (1989) 50–51.

"Calcium Aluminate glass fibres: drawing from supercooled melts versus inviscid melt spinning" F.T. Wallenberger N.E. Weston, & S.D. Brown, Materials Letters 11 (1991), 229–235.

J. Bauer, et al., "Solubility and Durability of Manmade Mineral Fibers in Physiological Fluids" (nineteen pages; dated no later than 1988).

Standard Test Methods for Fire Tests of Building Construction and Materials (ASTM E119–88) (fourteen pages; 1988).

SALINE SOLUBLE INORGANIC FIBRES

This is a continuation of application Ser. No. 08/535,587, filed Sep. 28, 1995, now abandoned, which is a continuation of application Ser. No. 08/039,086, filed Apr. 9, 1993, filed as application No. PCT/GB/93/00085 filed Jan. 15, 1993, now abandoned.

This invention relates to saline soluble, non-metallic, amorphous, inorganic oxide, refractory fibrous materials.

Inorganic fibrous materials are well known and widely used for many purposes (e.g. as thermal or acoustic insulation in bulk, mat, or blanket form, as vacuum-formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health.

Whether this mechanism is true or not regulatory agencies have indicated a desire to categorise any inorganic fibre product that has a respiratory fraction as 'hazardous', regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos-linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. The shorter the time a fibre is resident in the body the less damage it can do. H. Förster in 'The behaviour of mineral fibres in physiological solutions' (*Proceedings of 1982 WHO IARC Conference*, Copenhagen, Volume 2, pages 27–55 (1988)) discussed the behaviour of commercially produced mineral fibres in physiological saline solutions. Fibres of widely varying solubility were discussed.

International Patent Application No. WO87/05007 disclosed that fibres comprising magnesia, silica, calcia and less than 10 wt % alumina are soluble in saline solution. The solubilities of the fibres disclosed were in terms of parts per million of silicon (extracted from the silica-containing material of the fibre) present in a saline solution after 5 hours of exposure. The highest value revealed in the examples had a silicon level of 67 ppm. In contrast, and adjusted to the same regime of measurement, the highest level disclosed in the Förster paper was equivalent to approximately 1 ppm. Conversely if the highest value revealed in the International Patent Application was converted to the same measurement regime as the Förster paper it would have an extraction rate of 901,500 mg Si/kg fibre—i.e. some 69 times higher than any of the fibres Förster tested, and the fibres that had the highest extraction rate in the Förster test were glass fibres which had high alkali contents and so would have a low melting point. This is convincingly better performance even taking into account factors such as differences in test solutions and duration of experiment.

International Patent Application No. WO89/12032 disclosed additional fibres soluble in saline solution and discusses some of the constituents that may be present in such fibres.

European Patent Application No. 0399320 disclosed glass fibres having a high physiological solubility.

Further patent specifications disclosing selection of fibres for their saline solubility are European 0412878 and 0459897, French 2662687 and 2662688, PCT WO86/04807 and WO90/02713.

The refractoriness of the fibres disclosed in these various prior art documents varies considerable. The maximum service temperature of any of these disclosed fibres (when used as refractory insulation) is up to 815° C. (1500° F.).

Service temperature for refractory insulation is definable in many ways but to be consistent with the above mentioned International Patent Applications this application shall mean by service temperature that temperature at which the fibre shows acceptable shrinkage (maximum of 5% linear shrinkage after exposure to temperature for 24 hours) and at which the fibre has not appreciably suffered through excessive sintering or softening.

There is a demand for physiologically soluble fibres having a service temperature of greater than 815° C., particularly for such fibres having a service temperature above 900° C.

Testing for physiological solubility and safety can be done by inhalation studies on, e.g. rats. However such studies are extremely time consuming and costly. A study can take of the order of 2½ years from start and can easily cost £1 million per study. A cheaper alternative is to test for solubility in physiological or like fluids in vitro.

Testing of an inorganic fibre for solubility in physiological solutions is not so time consuming, but there is currently no way of predicting which systems will produce such soluble fibres. Therefore anyone seeking to find such soluble fibres has to work on a trial and error basis assisted by what is commonly known as 'chemical intuition' but is equally commonly known as 'a hunch'. Such trial and error testing is laborious and time consuming. Further, once a fibre is found that is soluble there is no guarantee that it will be usable at useful service temperatures.

Accordingly there is a demand for a method of predicting whether a fibre will have a reasonable solubility in physiological solutions, and further there is a demand that such a test should preferably give an indication as to expected service temperature.

Shrinkage of inorganic refractory fibres occurs through two mechanisms; the first is viscous flow of the fibre material. Most inorganic refractory fibres are glasses and so may be defined as liquids having an exceedingly high viscosity (but still liable to flow). By their nature fibres are elongate and so have a high surface area per unit volume. As the reduction of surface area is a means of reducing the surface energy of a material, when the glass becomes fluid enough it will flow so as to reduce surface area. This flow results in a coarsening and shortening of the fibres and so to shrinkage, and in the extreme results in disruption of the fibres into separate particles.

The second mechanism leading to shrinkage is that at elevated temperatures glasses may crystallise to form one or more crystal phases. Usually these crystal phases have a smaller molar volume than the glasses from which they crystallise and so shrinkage results. Some fibres are known for which the molar volume of the crystalline form exceeds that of the glass (for example $Al_2O_3/SiO_2$ glassy fibres may crystallise to form mullite crystals). In these cases the expansion due to crystallisation may oppose the shrinkage caused by viscous flow.

If shrinkage through viscous flow occurs at a much lower temperature than crystallisation then the crystallisation may not be able to compensate for such shrinkage.

There is a demand for a fibre in which both viscous flow and crystallisation occur at as high and as similar a temperature as possible, and preferably in which the expansion due to crystallisation closely matches the shrinkage due to viscous flow so that the net effect is as close to zero shrinkage as possible.

When used as refractory insulation inorganic refractory fibres are used in several forms. The fibres may be supplied as a bulk material, but in this form the fibres are difficult to handle for many applications. Alternatively the fibre may be supplied as a blanket. Blanket fibre is generally made by a process of sucking fibre from air onto a conveyor to form a blanket. Because the fibres tend to be aligned parallel to the conveyor surface they can separate easily. Accordingly the blanket fibres are secured together by adding a binder to lock the fibres together, or by needling the blanket, or both. In needling needles are passed through the thickness of the blanket to push and draw fibres to lie transverse to the blanket and so tie the fibres together. Because binders are usually resins, such as phenolic resins, they burn off on first firing. There is a desire to reduce the amount of such binders used both because of possible health implications in handling, and because the combustion products may affect the strength of the fibres. Thus needled blanket is usually preferred.

The fibres may also be supplied as blocks, generally made from assembled layers of inorganic fibre blanket.

For some fibres needling is not possible. Crystalline fibres are generally too brittle to stand the stresses involved. For the fibres known in the industry as glass fibres (which are generally used for low temperature applications) the amount of 'shot' (unfiberised glass particles) present is generally too high to allow needling as the shot damages the needles. There is no needled blanket on the market that has a maximum service temperature in the range 900° C.–1200° C. There are needled blankets having a higher maximum service temperature but these use expensive fibres in comparison with other fibres usable (with the aid of binders) as blanket in the temperature range 900° C.–1200° C.

Accordingly there is a demand for needled fibre blanket formed from inexpensive materials, being soluble in saline solutions, and having a maximum service temperature in the range 900° C.–1200° C.

As stated previously refractory oxide fibres are made by several methods all of which involve the formation of a melt of oxides and the subsequent fiberisation of the melt by e.g. spinning or blowing.

The melt of oxide material is often formed by electrical discharge melting of the constituent raw materials. The applicants, in manufacture of a $CaO/MgO/SiO_2$ refractory oxide fibre encountered problems due to the necessity of handling CaO. These problems were discovered to be due to the moisture content of CaO as commercially available. One of the problems of use of CaO is the outgasing that results upon melting and this led at the least to a porous melt pool which caused fluctuations in the melt current; in the extreme the outgasing was explosive. Additionally use of CaO appeared to cause accelerated attack on the melt electrodes. Also CaO is a difficult and corrosive material to handle.

Accordingly there is a need for a process that minimises the use of CaO.

Accordingly the present invention provides the following features both independently and in combination:

A. Use of a vitreous inorganic fibre in the knowledge that it has a composition meeting the criteria either:—that the calculated sum of the free energies of hydration of the compounds that would or could be present at equilibrium (on the basis of knowledge, informed belief or reasonable assumption) is more negative than −10 kcal/100 grams (−418.4 kJ/kg) of composition; or that the percentage of non-bridging oxygens is more than 30%. Such compositions tend to be saline soluble.

B. Use of such a vitreous inorganic fibre in the knowledge that it has a composition meeting the criterion that the ratio of glass modifiers to network formers is less than a critical value (for $SiO_2$ based compositions the critical value is 1). Such compositions tend to be glass formers.

C. The invention also encompasses fibres selected by adopting such criteria as a test for solubility and glass formation.

D. Use as saline soluble fibres having a shrinkage of less than 3.5% when exposed to 1000° C. for 24 hours and/or 800° C. for 24 hours, of vitreous fibres having a composition comprising (in weight %):

| | | |
|---|---|---|
| $SiO_2$ | >58% | (for MgO =< 10%) and |
| $SiO_2$ | >58% + 0.5 (% MgO −10) | (for MgO >= 10%) |
| ($SiO_2$ preferably being below 70%) | | |
| CaO | 0%–42% | |
| MgO | 0%–31.33% | |
| $Al_2O_3$ | 0%–<3.97% | | and being essentially free of fluxing components such as alkali metals and boron oxide.

E. In one such usage the first crystalline material resulting on crystallisation has the crystal structure of diopside and has the composition consisting essentially of:

| Component | Composition A Weight percent |
|---|---|
| $SiO_2$ | 59–64 |
| $Al_2O_3$ | 0–3.5 |
| CaO | 19–23 |
| MgO | 14–17 |

F. In a second such usage the first crystalline material resulting on crystallisation has the crystal structure of wollastonite/pseudowollastonite and has the composition consisting essentially of:

| Component | Composition B Weight percent |
|---|---|
| $SiO_2$ | 60–67 |
| $Al_2O_3$ | 0–3.5 |
| CaO | 26–35 |
| MgO | 4–6 |

G. The fibres used in such manner may further be used as needled blankets.

H. Preferably the fibres of the general composition and compositions A and B mentioned above have a $SiO_2$ content (expressed as a weight percentage of the constituents $SiO_2$, CaO and MgO) of greater than 60%.

I. The present invention further provides a method for the manufacture of refractory oxide fibres containing calcium and silicon by the formation of an oxide melt containing calcium and silicon characterised in that all or part of the calcium and all or part of silicon is provided by a calcium silicate.

BRIEF DESCRIPTION OF DRAWINGS

The invention is illustrated by way of example in the following description and with reference to the drawings in which.

Figure 1:
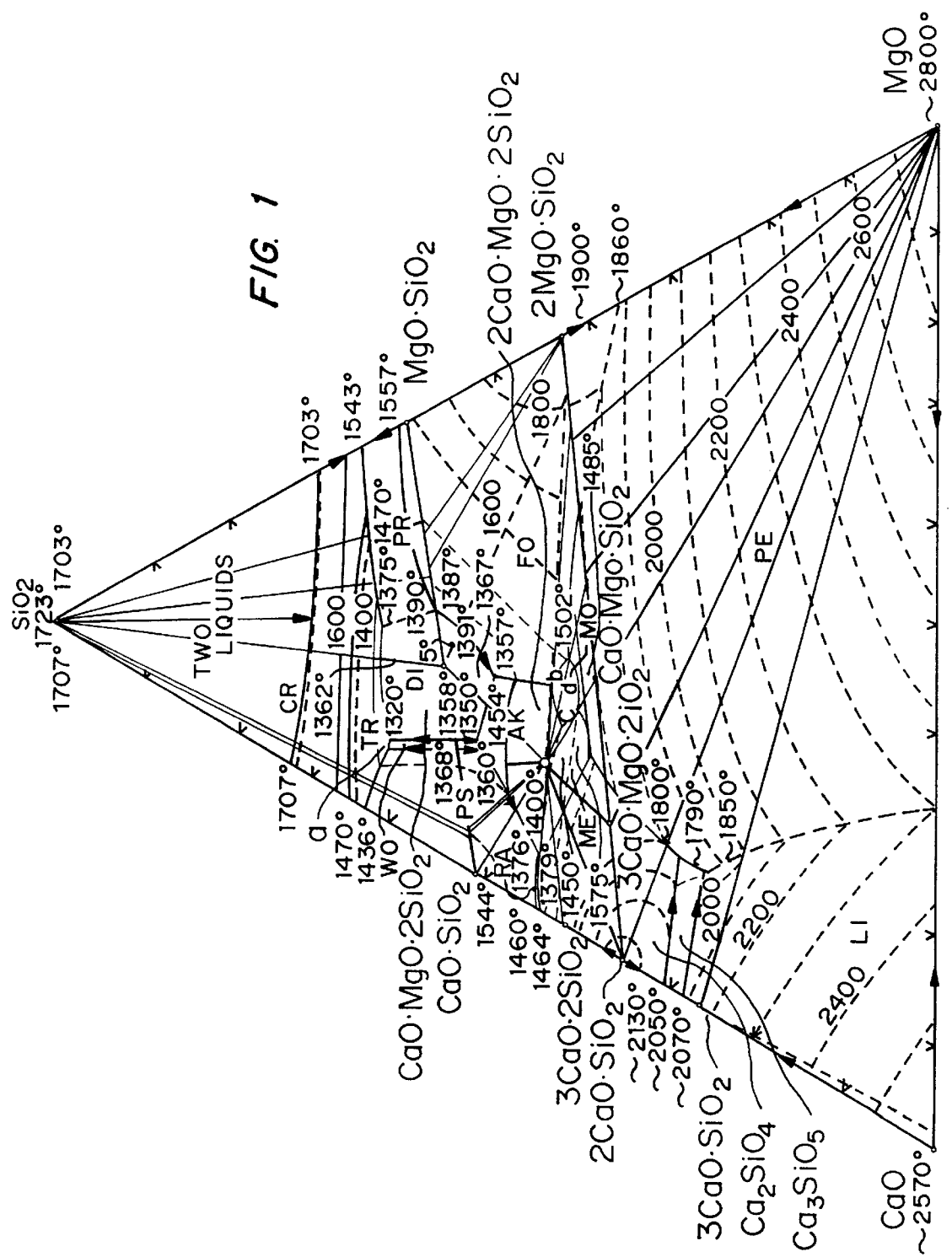
FIG. 1 is a three-axis phase diagram indicating the crystalline phases in the system $SiO_2/CaO/MgO$ (*Phase Diagrams for Ceramists*, The American Ceramic Society, 1964) a key to this diagram is at the end of the specification.
Figure 2:
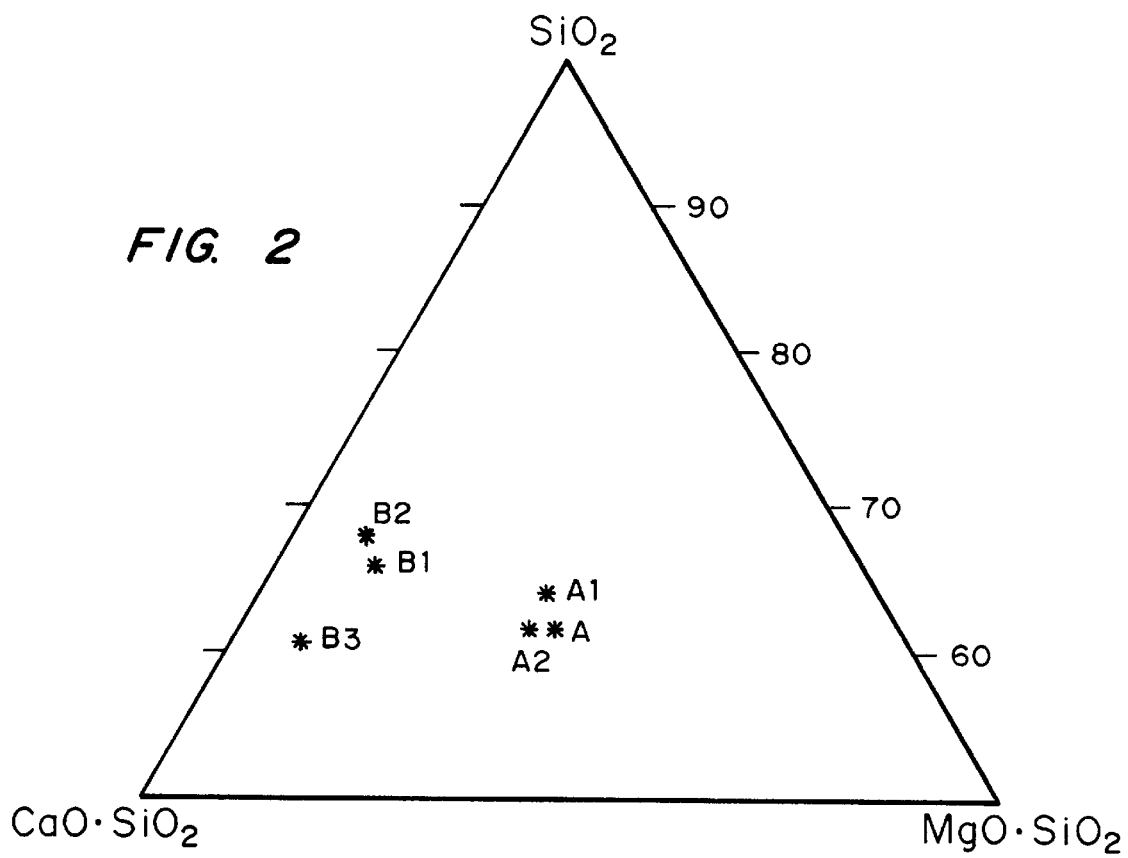
FIG. 2 is a three-axis composition plot of the projection onto the $SiO_2/CaO/MgO$ phase field of compositions comprising $SiO_2$, CaO, MgO and $Al_2O_3$.

A series of fibres were made of the compositions shown in Table 1. These fibres were melt spun by using a vertical spinning system of the type known for making inorganic fibres. Also shown in Table 1 are the compositions of some comparative commercially available inorganic oxide fibres and glass fibres.

TABLE 1

| | $Al_2O_3$ | $SiO_2$ | CaO | MgO | $ZrO_2$ | |
|---|---|---|---|---|---|---|
| SW-A | 3.3 | 59.2 | 20.5 | 15.5 | — | |
| SW-A1 | 1.1 | 63.7 | 20.5 | 15.2 | — | |
| SW-A2 | 0.8 | 60.8 | 21.4 | 15.4 | — | |
| SW-B1 | 2.3 | 65.3 | 26.8 | 5.7 | — | |
| SW-B2 | 1.3 | 66.9 | 27.5 | 5.2 | — | |
| SW-B3 | 1.0 | 60.0 | 34.0 | 4.4 | — | |
| COMPARATIVE EXAMPLES | | | | | | |
| | $Al_2O_3$ | $SiO_2$ | CaO | MgO | $ZrO_2$ | MST |
| CRBT | 46.5 | 53 | 0.04 | 0.01 | — | 1260° C. |
| CWBT | 40.6 | 49.5 | 5.50 | 4.00 | — | 870° C. |
| CHBT | 49.7 | 35.1 | 0.04 | 0.01 | 14.7 | 1425° C. |
| Glass Fibre | 15.2/ 15.5 | 53.7/ 57.5 | 21.1/ 21.8 | 1.3/ 1.6 | — | + 5.9–6.2% $B_2O_3$ 0.11–0.12% $TiO_2$ 0.46% $Na_2O$ 0.32–0.33% $K_2O$ |
| Needled Glass Fibre | 3.7 | 60.5/ 60.0 | 8.1 7.9 | 4.0 | — | + 2.85–2.95% $B_2O_3$ 13.5% $Na_2O$ 1.0% $K_2O$ |

[MST = Maximum Service Temperature (oxidising atmosphere)]

The fibres SW-A, SW-A1, SW-A2, SW-B1, SW-B2 and SW-B3 were tested for solubility by the following method.

The fibre was first chopped in the following manner. 2.5 g of fibre (deshotted by hand) was liquidised with 250 cm³ of distilled water in a domestic Moulinex (Trade Mark) food blender for 20 seconds. The suspension was then transferred to a 500 cm³ plastic beaker and allowed to settle after which as much liquid as possible was decanted and the remaining liquid removed by drying in an oven at 110° C.

The solubility test apparatus comprised a shaking incubator water bath, and the test solution had the following composition:

| Compound | Name | Grams |
|---|---|---|
| NaCl | Sodium chloride | 6.780 |
| $NH_4Cl$ | Ammonium chloride | 0.540 |
| $NaHCO_3$ | Sodium bicarbonate | 2.270 |
| $Na_2HPO_4.H_2O$ | Disodium hydrogen phosphate | 0.170 |
| $Na_3C_6H_5O_7.2H_2O$ | Sodium citrate dihydrate | 0.060 |
| $H_2NCH_2CO_2H$ | Glycine | 0.450 |
| $H_2SO_4$ s.g. 1.84 | Sulphuric acid | 0.050 |

The above materials were diluted to 1 litre with distilled water to form a physiological-like saline solution.

0.500 grams±0.0003 grams of chopped fibre was weighed into a plastic centrifuge tube and 25 cm³ of the above saline solution added. The fibre and saline solution was shaken well and inserted into the shaking incubator water bath maintained at body temperature 37° C.±1° C.). The shaker speed was set at 20 cycles/minute.

After the desired period (usually 5 hours or 24 hours) the centrifuge tube was removed and centrifuged at ≈4500 revs/minute for approximately 5 minutes. Supernatant liquid was then drawn off using a syringe and hypodermic needle. The needle was then removed from the syringe, air expelled from the syringe, and the liquid passed through a filter (0.45 micron cellulose nitrate membrane filter paper [WCN type from Whatman Labsales Limited]) into a clean plastic bottle. The liquid was then analysed by atomic absorption using a Thermo Jarrell Ash Smith—Hiefje II machine.

The operating conditions were:

| ELEMENT | WAVELENGTH (nm) | BAND WIDTH | CURRENT (MA) | FLAME (Nitrous Oxide + Acetylene) |
|---|---|---|---|---|
| Al | 309.3 | 1.0 | 8 | Fuel Rich |
| $SiO_2$ | 251.6 | 0.3 | 12 | " |
| CaO | 422.7 | 1.0 | 7 | Fuel Lean |
| MgO | 285.2 | 1.0 | 3 | " |

The procedure and standards adopted for determining the above elements were as set out below.

$SiO_2$ can be determined without dilution up to 250 ppm concentration (1 ppm≡1 mg/Litre). Above this concentration an appropriate dilution was made volumetrically. A 0.1% KCl solution (0.1 g in 100 cm³) was added to the final dilution to prevent ionic interference. NB If glass apparatus is used, prompt analysis is necessary.

From a stock solution of 1000 ppm pure ignited silica (99.999%) (fused with $Na_2CO_3$ at 1200° C. for 20 minutes in a platinum crucible (0.2500 g $SiO_2$/2 g $Na_2CO_3$) and dissolved in dilute hydrochloric acid (4 molar) made up to 250 cm³ with distilled water in a plastic volumetric flask) the following standards were produced:

| STANDARD (PPM $SiO_2$) | STOCK SOLUTION (cm³) |
|---|---|
| 10.0 | 1.0 |
| 20.0 | 2.0 |
| 30.0 | 3.0 |
| 50.0 | 5.0 |
| 100.0 | 10.0 |
| 250.0 | 25.0 |

Aluminium may be measured directly from the sample without dilution. Standards of 1.0, 5.0 and 10.0 ppm Al may be used. For calibration readings are multiplied by 1.8895 to convert from Al to $Al_2O_3$.

A standard Al atomic absorption solution (e.g. BDH 1000 ppm Al) was bought and diluted using an accurate pipette to the desired concentration. 0.1% KCl was added to prevent ionic interference.

Calcium may require dilutions on the sample before determination can be carried out (i.e. ×10 and ×20 dilutions). Dilutions must contain 0.1% KCl.

A standard Ca atomic absorption solution (e.g. BDH 1000 ppm Ca) was diluted with distilled water and an accurate pipette to give standards of 0.5, 4.0 and 10.0 ppm. 0.1% KCl is added to prevent ionic interference. To convert readings obtained from Ca to CaO a factor of 1.4 was used.

Magnesium may require dilutions on the sample before determinations can be made (i.e. ×10 and ×20). Add 0.1% KCl to each dilution. To convert Mg to MgO multiply by 1.658.

A standard Mg atomic absorption solution (e.g. BDH 1000 ppm Mg) was diluted with distilled water and an accurate pipette to give standards of 0.5, 1.0 and 10.0 ppm Mg. 0.1% KCl was added to prevent ionic interference.

All stock solutions were stored in plastic bottles.

The results of the tests are indicated in Table 2.

TABLE 2

| | BODY FLUIDS SOLUBILITY (ppm) | | | | | |
|---|---|---|---|---|---|---|
| | $SiO_2$ | | CaO | | MgO | |
| | 5 h | 24 h | 5 h | 24 h | 5 h | 24 h |
| SW-A | 98 | 120 | 63 | 56 | 33 | 66 |
| SW-A1 | 83 | 141 | 32 | 70 | 21 | 70 |
| SW-A2 | 130 | 202 | 43 | 73 | 100 | 177 |
| SW-B1 | 58 | 77 | 10 | 38 | 5 | 9 |
| SW-B2 | 64 | 121 | 27 | 55 | 5 | 10 |
| SW-B3 | 138 | 192 | 80 | 46 | 8 | 21 |

Fibres with the best solubility (SW-A2 and SW-B3) were then tested, after annealing at varying temperatures, and compared with the comparative examples of Table 1. The results are shown in Table 3.

It can be seen that for the SW-A2 fibre, with increasing annealing temperature, the silica solubility drops progressively. In contrast the SW-B3 composition shows no loss in solubility up to 800° C. and although a reduction in solubility is shown above that temperature it is not as dramatic as for SW-A2. Despite this difference in solubility it is to be noted that only the needled GF fibre shows a comparable silica solubility and that material melts at 700° C.

The user is primarily concerned with the solubility of the fibre as received as it is in this condition that most handling occurs; as received both SW-A2 and SW-B3 fibres have extremely high solubility. Even after exposure to 800° C. and 1000° C. these fibres have solubilities much higher than other high temperature use fibres.

To investigate the reasons underlying the difference in solubilities after high temperature annealing between the SWA-2 and SW-B3 fibres qualitative X-ray diffraction was done on the fibres. The results are indicated in Table 4 and it can be seen that the SW-B3 fibre forms pseudowollastonite and wollastonite, whereas the SW-A2 fibre forms diopside. It appears therefore that the crystalline diopside has a lower solubility in physiological saline solution than the crystalline pseudowollastonite and wollastonite material precipitated from the SW-B3 fibre.

TABLE 4

| Sample | Condition | Qualitative XRD |
|---|---|---|
| SW-A2 | 600° C., 48 hours | Amorphous |
| SW-A2 | 800° C., 48 hours | Amorphous with small amount Diopside |
| SW-A2 | 1000° C., 48 hours | Diopside |
| SW-B3 | 600° C., 48 hours | Amorphous |
| SW-B3 | 800° C., 48 hours | Amorphous |
| SW-B3 | 1000° C., 48 hours | Pseudowollastonite & Wollastonite |

Various of the fibres were then tested for their shrinkage characteristics. Table 5 shows the results of Shrinkage tests on all the test fibres and on some of the comparative fibres. These results were obtained by proposed ISO standard ISO/TC33/SC2/N220 (equivalent to British Standard BS 1920, part 6,1986) with some modifications to account for sample size. The method in summary comprises the manufacture of vacuum cast preforms, using 75 g of fibre in 500 cm³ of 0.2% starch solution, into a 120×65 mm tool. Platinum pins (approx 0.1–0.3 mm diameter) were placed 100×45 mm apart in the 4 corners. The longest lengths (L1 & L2) and the diagonals (L3 & L4) were measured to an accuracy of ±0.01 mm using a travelling microscope attached to a steel rule with a vernier scale. The samples were placed in a furnace at temperature and left for 24 hours. The shrinkage values are given as an average of the 4 measurements.

TABLE 3

| | | Solubility Analyses | | | | | |
|---|---|---|---|---|---|---|---|
| | | CaO (ppm) | | MgO (ppm) | | $SiO_2$ (ppm) | |
| Fibre | Condition | 5 hrs | 24 hrs | 5 hrs | 24 hrs | 5 hrs | 24 hrs |
| SW-A2 | As received | 58 | 37 | 37 | 3 | 89 | 130 |
| SW-A2 | 600° C., 48 hrs | 33 | 56 | 27 | 43 | 60 | 108 |
| SW-A2 | 800° C., 48 hrs | 35 | 53 | 17 | 30 | 43 | 87 |
| SW-A2 | 1000° C., 48 hrs | 7 | 3 | 3 | 2 | 11 | 21 |
| SW-B3 | As received | 35 | 69 | 7 | 22 | 22 | 100 |
| SW-B3 | 600° C., 48 hrs | 61 | 150 | 12 | 22 | 55 | 130 |
| SW-B3 | 800° C., 48 hrs | 41 | 90 | 3 | 7 | 24 | 144 |
| SW-B3 | 1000° C., 48 hrs | 18 | 40 | 3 | 3 | 17 | 60 |
| CRBT | As received | 10 | 8 | 6 | 3 | 5 | 3 |
| CHBT | As received | 16 | 10 | 7 | 3 | 4 | 0.3 |
| Glass Fibre | As received | 14 | 17 | 5 | 3 | 5 | 7 |
| Needled GF | As received | 17 | 34 | 8 | 15 | 66 | 85 |
| Needled GF | 600° C., 48 hrs | 11 | 26 | 7 | 10 | 19 | 37 |
| Mineral Fibre | As received | 16 | 16 | 7 | 6 | 8 | 9 |

[The Glass Fibre and Needled Glass Fibre had the compositions shown in Table 1.]

TABLE 5

LINEAR SHRINKAGE (%) (24 h at temperature)

| Temp. °C. | SW-A | SW-A1 | SW-A2 | SW-B1 | SW-B2 | SW-B3 |
|---|---|---|---|---|---|---|
| 730 | 1.45 | | 1.43 | 1.02 | 0.22 | |
| 870 | | | | 0.41 | | |
| 900 | | | 1.07 | | | 1.07 |
| 1000 | | 1.04 | 1.3 | 0.51 | 0.6 | 1.1 |
| 1100 | | 0.71 | 1.8 | | 0.73 | 2.2 |
| Maximum Service Temperature °C. | 850 | 1050 | 1050 | 1050 | 1050 | 1000 |

It can be seen that in SW-A, SW-A1, SW-A2, SW-B1, SW-B2 and SW-B3, owing to the increase in molar volume on crystillisation, the linear shrinkage at the maximum service temperature is less than 3.5%.

Table 6 shows the results of a further series of shrinkage tests made in the same way.

TABLE 6

| Sample | Measurement Direction c.f. Roll Direction | Test Temperatures °C. | Linear Shrinkages % Range | Mean |
|---|---|---|---|---|
| SW-A2 | Parallel | 850 | 1.1–1.4 | 1.2 |
| SW-A2 | Perpendicular | 850 | 0.7–1.5 | 1.3 |
| SW-A2 | Parallel | 900 | 0.5–1.1 | 0.9 |
| SW-A2 | Perpendicular | 900 | 1.9–4.5 | 3.0 |
| SW-A2 | Parallel | 1000 | 0.5–2.9 | 1.3 |
| SW-A2 | Perpendicular | 1000 | 1.7–2.9 | 2.2 |
| SW-A2 | Parallel | 1100 | 0.7–1.5 | 1.0 |
| SW-A2 | Perpendicular | 1100 | 1.0–2.6 | 1.8 |
| SW-B3 | Parallel | 900 | 1.6–1.8 | 1.7 |
| SW-B3 | Perpendicular | 900 | 1.4–2.4 | 2.1 |
| SW-B3 | Parallel | 1000 | 1.6–2.3 | 1.9 |
| SW-B3 | Perpendicular | 1000 | 1.0–2.3 | 1.7 |
| SW-B3 | Parallel and Perpendicular | 1100 | Complete Melting (Lantern type remnant) | |

Figure 3:
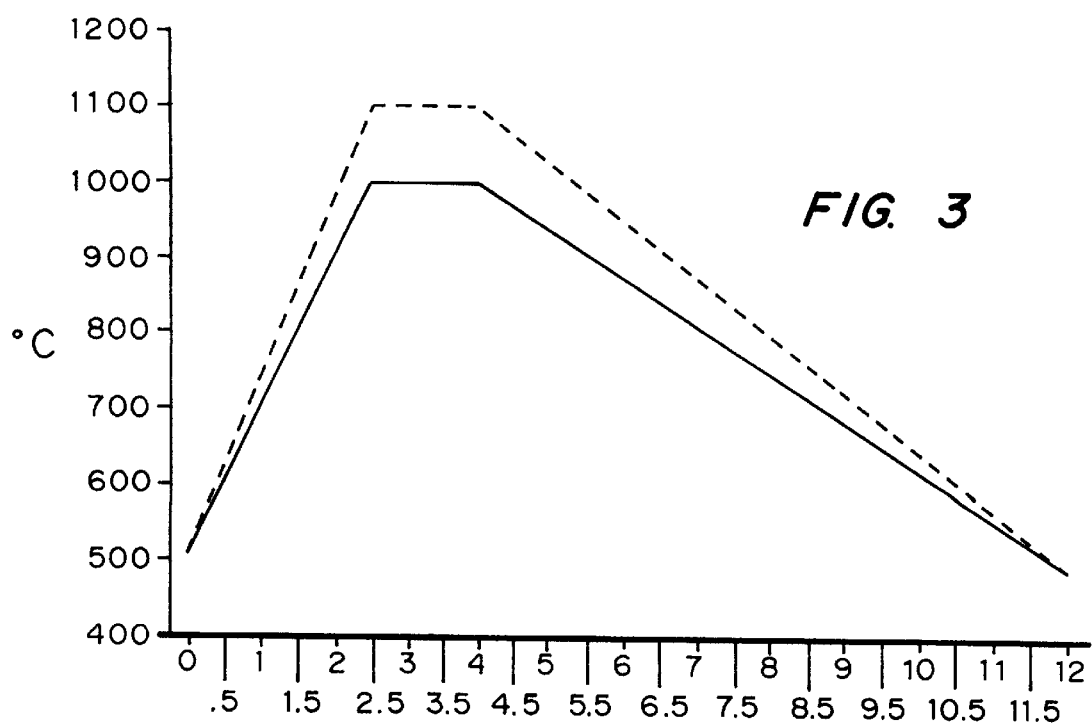
FIG. 3 is a temperature/time plot of the firing regime used in a series of cyclic exposure tests of experimental compositions.

To ascertain the applicability of these tests to long term usage a series of cyclic shrinkage tests were undertaken on the materials and the heating schedule used for these cyclic tests is shown in FIG. 3.

The results of the tests are shown in Tables 7 & 8 (the two figures given for SW-B3 are due to slight differences in chemical analysis [the fibre at the end of a production run of fibre tends to have slightly differing composition to that at the beginning of a production run of fibre]).

As a further comparison with the above discussed materials a melt was made comprising 55% $SiO_2$, 29.9% CaO and 18.6% MgO. Fibres made using this composition had a maximum service temperature of 700° C. and melted at 800° C.

As these results were encouraging the applicants conducted a further and extensive series of tests, concentrating on the SW-A2 and SW-B3 compositions, to ascertain the reproducibility of these results and the boundaries of the useful compositions.

Table 9 (three pages) below gives the compositions of a series of melts, ranked on silica content, and showing the shrinkage figure after exposure to 1000° C. for 24 hours (1st column) and 800° C. for 24 hours (2nd column). These shrinkages were measured by the same method as the shrinkages given above but measurements were made with a travelling microscope with a digital linear scale accurate to ±5 μm. It can clearly be seen that all fibres with a silica content of less than 58% have a shrinkage at 1000° C. of greater than 3.5% save two (B3-3 and 708). These fibres, together with some fibres with a silica content of greater than 58% although showing a reasonable figure at 1000° C., show a very poor figure at 800° C. Compositions with an $SiO_2$ content of greater than 70% appear to fiberise poorly. This may be because such compositions have two liquids in the melt as may be appreciated from FIG. 1

TABLE 7

| | CYCLIC SHRINKAGE (LINEAR) (%) | | |
|---|---|---|---|
| Product | 1000° C. | 1100° C. | 24 h at 1000° C. |
| No. cycles | 58 | 42 | |
| CRBT | 2.0 | 2.7 | 1.9 |
| CWBT | 15.0 | 13.3 | 12.1 |
| SW-A2 | 0.33 | 2.0 | 1.3 |
| SW-B3 | 1.00 | 1.67 | 1.1 |
| SW-B3 | 0.33 | 0.67 | 1.1 |

Accuracy: + or − 0.33%

TABLE 8

| | CYCLIC SHRINKAGE (%) | | | | |
|---|---|---|---|---|---|
| | LINEAR SHRINKAGE | | | THICKNESS SHRINKAGE | |
| | | | 24 h at | | |
| PRODUCT | 1000° C. | 1100° C. | 1000° C. | 1000° C. | 1100° C. |
| No. cycles | 104 | 100 | | 104 | 100 |
| CRBT | 1.47 | 3.1 | 1.9 | 0.47 | 11.19 |
| CWBT | 14.4 | 15.2 | 12.1 | 38.63 | 32.14 |
| SW-A2 | 1.5 | 2.1 | 1.3 | 8.58 | 8.75 |
| SW-B3 | 1.73 | 1.63 | 1.1 | 7.24 | 7.57 |
| SW-B3 | 1.47 | 1.77 | 1.1 | 7.02 | 7.16 |

Accuracy: + or − 0.3% (%)

TABLE 9

| | Analysed Compositions (Weight %) | | | | | | | | Shrinkage at °C. | | Rationalised Compositions | | |
|---|---|---|---|---|---|---|---|---|---|---|---|---|---|
| Melt | $SiO_2$ % | CaO % | MgO % | $Al_2O_3$ % | $Na_2O$ % | $K_2O$ % | $Fe_2O_3$ % | $ZrO_2$ % | 1000 | 800 | $SiO_2$ % | CaO % | MgO % |
| A2-28 | 78.07 | 2.07 | 17.15 | 0.15 | <0.05 | <0.05 | 0.11 | 1.76 | ¶ | | 80.3 | 2.1 | 17.6 |
| A2-16 | 73.43 | 12.40 | 10.09 | 0.19 | <0.05 | <0.05 | 0.11 | 2.23 | 0.7 | * | 76.6 | 12.9 | 10.5 |
| A2-32 | 73.09 | 6.36 | 19.60 | 0.23 | 0.05 | <0.05 | 0.11 | 0.36 | ¶ | | 73.8 | 6.4 | 19.8 |
| B3-32 | 72.38 | 23.43 | 0.65 | 0.31 | 0.31 | 0.09 | 0.22 | 0.72 | ¶ | | 75.0 | 24.3 | 0.7 |

TABLE 9-continued

|  | Analysed Compositions (Weight %) | | | | | | | | Shrinkage at ° C. | | Rationalised Compositions | | |
| --- | --- | --- | --- | --- | --- | --- | --- | --- | --- | --- | --- | --- | --- |
| Melt | SiO$_2$ % | CaO % | MgO % | Al$_2$O$_3$ % | Na$_2$O % | K$_2$O % | Fe$_2$O$_3$ % | ZrO$_2$ % | 1000 | 800 | SiO$_2$ % | CaO % | MgO % |
| A2-15 | 72.25 | 12.67 | 12.35 | 0.11 | <0.05 | <0.05 | 0.10 | 1.24 | 1.1 | * | 74.3 | 13.0 | 12.7 |
| A2-22 | 71.48 | 9.36 | 16.34 | 0.33 | 0.10 | <0.05 | 0.20 | 0.83 | 1.1 | * | 73.6 | 9.6 | 16.8 |
| A2-29 | 71.24 | 4.46 | 22.31 | 0.19 | <0.05 | <0.05 | 0.13 | 1.23 | 1.8 | *1.5 | 72.7 | 4.5 | 22.8 |
| A2-27 | 71.14 | 6.77 | 19.64 | 0.24 | 0.08 | <0.05 | 0.13 | 1.01 | 1.2 | *1.2 | 72.9 | 7.0 | 20.1 |
| B3-28 | 70.81 | 18.74 | 7.03 | 0.47 | 0.23 | 0.07 | 0.16 | 0.75 | 0.2 | * | 73.3 | 19.4 | 7.3 |
| A2-17 | 70.43 | 11.58 | 14.52 | 0.15 | <0.05 | <0.05 | 0.13 | 1.58 | 1.3 | * | 73.0 | 12.0 | 15.0 |
| A2-33 | 70.04 | 4.61 | 22.85 | 0.25 | 0.11 | <0.05 | 0.12 | 1.01 | ¶ |  | 71.9 | 4.7 | 23.4 |
| B3-18 | 69.42 | 23.27 | 3.76 | 0.43 | 0.37 | 0.06 | 0.12 | 0.47 | 0.4 |  | 72.0 | 24.1 | 3.9 |
| A2-6 | 69.29 | 15.17 | 12.76 | 0.07 | 0.25 | <0.05 | 0.11 | 1.13 | 1.5 |  | 71.3 | 15.6 | 13.1 |
| B3-16 | 68.74 | 24.99 | 1.71 | 0.65 | 0.38 | 0.10 | 0.24 | 1.03 | 0.3 | 0.2 | 72.0 | 26.2 | 1.8 |
| A2-26 | 68.65 | 8.12 | 19.26 | 0.29 | <0.05 | <0.05 | 0.21 | 0.98 | 1.5 | 1.5 | 71.5 | 8.4 | 20.1 |
| B3-27 | 68.56 | 20.98 | 7.00 | 0.78 | 0.35 | 0.08 | 0.17 | 0.79 | 0.8 | 0.7 | 71.0 | 21.7 | 7.3 |
| 759 | 68.33 | 17.45 | 12.60 | <0.05 | 0.11 | <0.05 | 0.33 | <0.05 | 1.7 | 1.1 | 69.5 | 17.7 | 12.8 |
| A2-20 | 68.19 | 11.58 | 16.57 | 0.40 | 0.19 | 0.05 | 0.21 | 0.91 | 1.1 | 1.0 | 70.8 | 12.0 | 17.2 |
| A2-31 | 67.62 | 8.45 | 21.72 | 0.32 | 0.09 | <0.05 | 0.15 | 0.64 | 2.3 | 1.9 | 69.2 | 8.6 | 22.2 |
| B3-31 | 67.59 | 27.76 | 0.49 | 0.40 | 0.40 | 0.11 | 0.22 | 1.01 | 0.7 |  | 70.5 | 29.0 | 0.5 |
| B3-19 | 67.58 | 24.91 | 3.65 | 0.45 | 0.37 | 0.07 | 0.15 | 0.65 | 0.5 |  | 70.3 | 25.9 | 3.8 |
| B3-17 | 67.25 | 26.68 | 1.86 | 0.70 | 0.45 | 0.10 | 0.23 | 0.57 | 0.3 |  | 70.2 | 27.9 | 1.9 |
| A2-13 | 66.67 | 14.87 | 16.01 | 0.11 | 0.05 | <0.05 | 0.10 | 0.92 | 1.6 |  | 68.4 | 15.2 | 16.4 |
| B3-22 | 66.17 | 21.28 | 9.34 | 0.52 | 0.33 | 0.08 | 0.18 | 0.54 | 1.1 | 0.8 | 68.4 | 22.0 | 9.6 |
| A2-10 | 66.17 | 16.22 | 15.80 | 0.49 | 0.06 | <0.05 | 0.09 | <0.05 | 2.2 | 1.9 | 67.4 | 16.5 | 16.1 |
| B3-15 | 65.86 | 29.82 | 1.78 | 0.47 | 0.45 | 0.08 | 0.18 | 0.51 | 0.3 |  | 67.6 | 30.6 | 1.8 |
| 719 | 65.77 | 25.69 | 8.12 | <0.05 | 0.24 | <0.05 | 0.23 | <0.05 | 0.5 |  | 66.0 | 25.8 | 8.2 |
| A2-5 | 65.69 | 18.74 | 13.78 | 0.18 | 0.16 | <0.05 | 0.10 | 0.14 | 1.9 | 1.0 | 66.9 | 19.1 | 14.0 |
| B3-4A | 65.50 | 25.81 | 4.88 | 2.05 | 0.28 | 0.12 | 0.16 | 0.24 | 1.4 | 1.0 |  |  |  |
| A2-8 | 65.33 | 16.86 | 14.24 | 0.22 | 0.13 | <0.05 | 0.14 | 1.17 | 1.5 |  | 67.7 | 17.5 | 14.8 |
| 718 | 65.23 | 27.14 | 6.95 | <0.05 | 0.24 | <0.05 | 0.20 | 0.49 | 0.4 |  | 65.7 | 27.3 | 7.0 |
| B3-14 | 65.11 | 24.91 | 5.54 | 0.58 | 0.43 | 0.09 | 0.19 | 0.61 | 1.0 |  | 68.1 | 26.1 | 5.8 |
| 721 | 65.08 | 27.26 | 5.33 | 0.06 | 0.17 | <0.05 | 0.08 | <0.05 | 0.3 | 0.6 | 66.6 | 27.9 | 5.5 |
| A2-34 | 64.85 | 6.63 | 26.20 | 0.23 | 0.06 | <0.05 | 0.16 | 0.80 | 3.4 | 3.9 | 66.4 | 6.8 | 26.8 |
| A2-21 | 64.16 | 13.74 | 19.98 | 0.34 | 0.17 | <0.05 | 0.11 | 0.13 | 3.2 | 3.3 | 65.6 | 14.0 | 20.4 |
| B3-30 | 64.13 | 31.93 | 0.37 | 0.64 | 0.45 | 0.09 | 0.14 | 0.28 | 0.6 |  | 66.5 | 33.1 | 0.4 |
| A2-35 | 64.12 | 8.88 | 24.88 | 0.29 | 0.10 | <0.05 | 0.13 | 0.47 | 7.3 | 7.1 | 65.5 | 9.1 | 25.4 |
| B3-23 | 64.09 | 23.26 | 9.33 | 0.56 | 0.36 | 0.09 | 0.16 | 0.30 | 1.0 |  | 66.3 | 24.0 | 9.7 |
| B3-5A | 63.74 | 25.41 | 4.68 | 3.97 | 0.26 | 0.12 | 0.17 | 0.58 | 7.4 | 4.3 |  |  |  |
| A2-30 | 63.68 | 16.06 | 18.21 | 0.40 | 0.11 | 0.07 | 0.15 | <0.05 | 2.7 | 1.6 | 65.0 | 16.4 | 18.6 |
| A2-9 | 63.66 | 21.44 | 12.96 | 1.49 | 0.32 | 0.10 | 0.11 | <0.05 | 1.9 | 0.9 | 64.9 | 21.9 | 13.2 |
| A2-12 | 63.56 | 16.55 | 18.00 | 0.33 | 0.11 | <0.05 | 0.08 | 0.05 | 1.0 | 2.3 | 64.8 | 16.9 | 18.3 |
| B3-6A | 63.24 | 24.83 | 4.59 | 5.70 | 0.27 | 0.11 | 0.15 | 0.15 | 21.6 | 18.8 |  |  |  |
| 723 | 62.61 | 29.79 | 5.44 | <0.05 | 0.17 | <0.05 | 0.13 | <0.05 | 0.4 | 0.5 | 64.0 | 30.4 | 5.6 |
| 757 | 62.60 | 20.92 | 15.22 | 0.20 | <0.05 | <0.05 | 0.16 | <0.05 | 1.3 | 2.9 | 63.4 | 21.2 | 15.4 |
| A2-25 | 62.36 | 10.99 | 24.18 | 0.33 | 0.10 | 0.05 | 0.16 | 0.07 | 6.1 |  | 63.9 | 11.3 | 24.8 |
| B3-13 | 62.33 | 30.62 | 2.06 | 0.55 | 0.65 | 0.09 | 0.17 | 0.91 | 0.8 | 0.9 | 65.6 | 32.2 | 2.2 |
| A2-7 | 61.98 | 23.37 | 11.98 | 0.44 | 0.25 | <0.05 | 0.10 | 0.23 | 1.4 |  | 63.7 | 24.0 | 12.3 |
| 725 | 61.83 | 28.13 | 7.54 | 0.10 | 0.36 | <0.05 | 0.17 | <0.05 | 0.6 |  | 63.4 | 28.9 | 7.7 |
| B3-11 | 61.71 | 33.25 | 2.33 | 0.69 | 0.52 | 0.12 | 0.25 | 0.59 | 0.9 |  | 63.4 | 34.2 | 2.4 |
| B3-24 | 61.62 | 25.53 | 9.73 | 0.58 | 0.38 | 0.10 | 0.17 | <0.05 | 1.8 | 1.2 | 63.6 | 26.4 | 10.0 |
| A2-24 | 61.38 | 13.62 | 22.74 | 0.31 | 0.16 | <0.05 | 0.14 | 0.08 | 3.3 | 12.3 | 62.8 | 13.9 | 23.3 |
| 722 | 61.33 | 31.08 | 5.25 | 0.05 | 0.20 | <0.05 | 0.16 | <0.05 | 1.3 |  | 62.8 | 31.8 | 5.4 |
| 924 | 61.32 | 19.78 | 14.54 | 2.57 | <0.05 | <0.05 | 0.09 | 0.66 | 0.3 | 3.0 | 64.1 | 20.7 | 15.2 |
| B3-2A | 60.83 | 32.30 | 0.48 | 4.15 | 0.35 | 0.15 | 0.19 | 0.12 | 7.5 | 3.3 |  |  |  |
| A2-14 | 60.74 | 25.30 | 11.66 | 0.28 | 0.18 | 0.05 | 0.13 | 0.16 | 1.8 |  | 62.2 | 25.9 | 11.9 |
| B3-1A | 60.32 | 32.27 | 3.99 | 1.74 | 0.32 | 0.10 | 0.15 | 0.09 | 2.5 | 1.7 |  |  |  |
| A2-11 | 60.32 | 24.28 | 13.24 | 0.25 | 0.18 | <0.05 | 0.09 | 0.08 | 1.8 | 1.1 | 61.7 | 24.8 | 13.5 |
| B3-9 | 60.28 | 34.49 | 2.50 | 0.76 | 0.50 | 0.13 | 0.28 | 0.49 | 1.6 | 1.7 | 62.0 | 35.4 | 2.6 |
| A2-23 | 60.20 | 18.59 | 18.78 | 0.48 | 0.19 | 0.08 | 0.15 | 0.05 | 18.9 | 10.7 | 61.7 | 19.1 | 19.2 |
| B3-1 | 60.11 | 32.56 | 3.80 | 0.79 | 0.54 | 0.12 | 0.23 | 0.82 | 0.5 |  | 62.3 | 33.8 | 3.9 |
| 932 | 59.85 | 21.60 | 15.65 | 1.50 | 0.06 | <0.05 | 0.18 | 0.11 | 12.8 |  | 61.6 | 22.3 | 16.1 |
| 692 | 59.82 | 34.34 | 5.44 | 0.13 | 0.19 | <0.05 | 0.08 | 0.17 | 2.1 |  | 60.0 | 34.5 | 5.5 |
| B3-3A | 59.54 | 31.64 | 0.67 | 5.91 | 0.33 | 0.15 | 0.21 | 0.41 | 43.3 | 15.3 |  |  |  |
| B3-25 | 59.53 | 28.15 | 9.22 | 0.48 | 0.39 | 0.08 | 0.14 | <0.05 | 2.3 |  | 61.4 | 29.1 | 9.5 |
| B3-29 | 59.40 | 36.00 | 0.68 | 0.92 | 0.43 | 0.14 | 0.23 | 0.17 | 0.9 |  | 61.8 | 37.5 | 0.7 |
| 714 | 59.05 | 32.00 | 8.27 | <0.05 | 0.27 | <0.05 | 0.40 | <0.05 | 0.7 | 1.2 | 59.5 | 32.2 | 8.3 |
| 696 | 58.81 | 30.91 | 6.15 | 0.21 | 0.18 | <0.05 | 0.08 | 0.24 | 0.3 | 1.4 | 61.3 | 32.2 | 6.4 |
| A2-19 | 58.71 | 18.48 | 19.74 | 0.54 | 0.20 | 0.07 | 0.19 | <0.05 | 4.7 |  | 60.6 | 19.0 | 20.4 |
| 586 | 58.65 | 35.03 | 3.90 | 0.13 | 0.23 | <0.05 | 0.16 | <0.05 | 1.9 | 1.6 | 60.1 | 35.9 | 4.0 |
| 694 | 58.39 | 33.10 | 6.02 | 0.27 | 0.20 | <0.05 | 0.10 | 0.17 | 1.6 | 1.9 | 59.9 | 33.9 | 6.2 |
| 765 | 57.78 | 3.90 | 35.07 | 2.12 | <0.05 | <0.05 | 0.23 | <0.05 | 34.2 |  | 59.7 | 4.0 | 36.3 |
| 660 | 57.74 | 34.65 | 4.83 | 1.15 | 0.24 | <0.05 | 0.19 | <0.05 | 24.7 |  | 59.4 | 35.6 | 5.0 |
| B3-20 | 57.57 | 32.70 | 6.07 | 0.91 | 0.57 | 0.13 | 0.22 | <0.05 | 30.9 |  | 59.8 | 33.9 | 6.3 |
| 712 | 57.54 | 35.39 | 4.61 | 0.06 | 0.23 | <0.05 | 0.12 | <0.05 | 4.4 | 3.4 | 59.0 | 36.3 | 4.7 |
| B3-21 | 57.38 | 36.62 | 2.43 | 0.73 | 0.51 | 0.11 | 0.16 | 0.08 | 30.3 |  | 59.5 | 38.0 | 2.5 |
| B3-26 | 56.98 | 30.50 | 9.44 | 0.62 | 0.44 | 0.11 | <0.05 | <0.05 | 39.8 | 26.6 | 58.8 | 31.5 | 9.7 |
| A2-18 | 56.96 | 26.29 | 13.01 | 0.66 | 0.51 | 0.10 | 0.19 | <0.05 | 36.2 |  | 59.2 | 27.3 | 13.5 |

TABLE 9-continued

| Melt | Analysed Compositions (Weight %) | | | | | | | | Shrinkage at ° C. | | Rationalised Compositions | | |
|---|---|---|---|---|---|---|---|---|---|---|---|---|---|
| | SiO₂ % | CaO % | MgO % | Al₂O₃ % | Na₂O % | K₂O % | Fe₂O₃ % | ZrO₂ % | 1000 | 800 | SiO₂ % | CaO % | MgO % |
| 971 | 56.82 | 23.92 | 17.36 | 0.74 | 0.18 | <0.05 | 0.14 | 0.05 | 41.7 | | 57.9 | 24.4 | 17.7 |
| 734 | 56.58 | 23.62 | 17.05 | 1.00 | 0.06 | <0.05 | 0.13 | 0.05 | 39.3 | | 58.2 | 24.3 | 17.5 |
| 973 | 56.18 | 24.45 | 16.81 | 0.50 | 0.08 | <0.05 | 0.14 | 0.05 | 34.9 | | 57.7 | 25.1 | 17.2 |
| B3-3 | 55.99 | 36.07 | 4.44 | 0.58 | 0.45 | 0.09 | 0.38 | 1.46 | 0.3 | 34.7 | 58.0 | 37.4 | 4.6 |
| 708 | 55.22 | 42.79 | 0.77 | <0.05 | 0.31 | <0.05 | 0.12 | <0.05 | 1.1 | 8.7 | 55.9 | 43.3 | 0.8 |
| 71 | 54.68 | 24.04 | 19.66 | 0.20 | 0.17 | <0.05 | 0.23 | <0.05 | 51.7 | | 55.6 | 24.4 | 20.0 |

*Poor fibres containing a lot of shot. All other constituents <0.1%.
¶Too poor to test for solubility or shrinkage

TABLE 10

| Melt | Analysed Compositions (Weight %) | | | | | | | | Solubilities ppm | | | Rationalised Compositions | | |
|---|---|---|---|---|---|---|---|---|---|---|---|---|---|---|
| | SiO₂ % | CaO % | MgO % | Al₂O₃ % | Na₂O % | K₂O % | Fe₂O₃ % | ZrO₂ % | SiO₂ | CaO | MgO | SiO₂ % | CaO % | MgO % |
| A2-28 | 78.07 | 2.07 | 17.15 | 0.15 | <0.05 | <0.05 | 0.11 | 1.76 | ¶ | | | 80.3 | 2.1 | 17.6 |
| A2-16 | 73.43 | 12.40 | 10.09 | 0.19 | <0.05 | <0.05 | 0.11 | 2.23 | 113 | 45 | 55 | 76.6 | 12.9 | 10.5 |
| A2-32 | 73.09 | 6.36 | 19.60 | 0.23 | 0.05 | <0.05 | 0.11 | 0.36 | ¶ | | | 73.8 | 6.4 | 19.8 |
| B3-32 | 72.38 | 23.43 | 0.65 | 0.31 | 0.31 | 0.09 | 0.22 | 0.72 | ¶ | | | 75.0 | 24.3 | 0.7 |
| A2-15 | 72.25 | 12.67 | 12.35 | 0.11 | <0.05 | <0.05 | 0.10 | 1.24 | 105 | 35 | 48 | 74.3 | 13.0 | 12.7 |
| A2-22 | 71.48 | 9.36 | 16.34 | 0.33 | 0.10 | <0.05 | 0.20 | 0.83 | 126 | 36 | 75 | 73.6 | 9.6 | 16.8 |
| A2-29 | 71.24 | 4.46 | 22.31 | 0.19 | <0.05 | <0.05 | 0.13 | 1.23 | 94 | 21 | 105 | 72.7 | 4.5 | 22.8 |
| A2-27 | 71.14 | 6.77 | 19.64 | 0.24 | 0.08 | <0.05 | 0.13 | 1.01 | 101 | 24 | 67 | 72.9 | 7.0 | 20.1 |
| B3-28 | 70.81 | 18.74 | 7.03 | 0.47 | 0.23 | 0.07 | 0.16 | 0.75 | 108 | 49 | 31 | 73.3 | 19.4 | 7.3 |
| A2-17 | 70.43 | 11.58 | 14.52 | 0.15 | <0.05 | <0.05 | 0.13 | 1.58 | 91 | 35 | 72 | 73.0 | 12.0 | 15.0 |
| A2-33 | 70.04 | 4.61 | 22.85 | 0.25 | 0.11 | <0.05 | 0.12 | 1.01 | ¶ | | | 71.9 | 4.7 | 23.4 |
| B3-18 | 69.42 | 23.27 | 3.76 | 0.43 | 0.37 | 0.06 | 0.12 | 0.47 | 145 | 66 | 17 | 72.0 | 24.1 | 3.9 |
| A2-6 | 69.29 | 15.17 | 12.76 | 0.07 | 0.25 | <0.05 | 0.11 | 1.13 | 152 | 48 | 70 | 71.3 | 15.6 | 13.1 |
| B3-16 | 68.74 | 24.99 | 1.71 | 0.65 | 0.38 | 0.10 | 0.24 | 1.03 | 132 | 72 | 10 | 72.0 | 26.2 | 1.8 |
| A2-26 | 68.65 | 8.12 | 19.26 | 0.29 | <0.05 | <0.05 | 0.21 | 0.98 | 183 | 31 | 97 | 71.5 | 8.4 | 20.1 |
| B3-27 | 68.56 | 20.98 | 7.00 | 0.78 | 0.35 | 0.08 | 0.17 | 0.79 | 122 | 54 | 20 | 71.0 | 21.7 | 7.3 |
| 759 | 68.33 | 17.45 | 12.60 | <0.05 | 0.11 | <0.05 | 0.33 | <0.05 | 117 | 38 | 40 | 69.5 | 17.7 | 12.8 |
| A2-20 | 68.19 | 11.58 | 16.57 | 0.40 | 0.19 | 0.05 | 0.21 | 0.91 | 162 | 31 | 69 | 70.8 | 12.0 | 17.2 |
| A2-31 | 67.62 | 8.45 | 21.72 | 0.32 | 0.09 | <0.05 | 0.15 | 0.64 | 103 | 26 | 72 | 69.2 | 8.6 | 22.2 |
| B3-31 | 67.59 | 27.76 | 0.49 | 0.40 | 0.40 | 0.11 | 0.22 | 1.01 | 112 | 50 | 4 | 70.5 | 29.0 | 0.5 |
| B3-19 | 67.58 | 24.91 | 3.65 | 0.45 | 0.37 | 0.07 | 0.15 | 0.65 | 163 | 44 | 21 | 70.3 | 25.9 | 3.8 |
| B3-17 | 67.25 | 26.68 | 1.86 | 0.70 | 0.45 | 0.10 | 0.23 | 0.57 | 162 | 49 | 13 | 70.2 | 27.9 | 1.9 |
| A2-13 | 66.67 | 14.87 | 16.01 | 0.11 | 0.05 | <0.05 | 0.10 | 0.92 | 159 | 47 | 70 | 68.4 | 15.2 | 16.4 |
| A2-10 | 66.17 | 16.22 | 15.80 | 0.49 | 0.06 | <0.05 | 0.09 | <0.05 | 122 | 42 | 52 | 67.4 | 16.5 | 16.1 |
| B3-22 | 66.17 | 21.28 | 9.34 | 0.52 | 0.33 | 0.08 | 0.18 | 0.54 | 174 | 62 | 57 | 68.4 | 22.0 | 9.6 |
| B3-15 | 65.86 | 29.82 | 1.78 | 0.47 | 0.45 | 0.08 | 0.18 | 0.51 | 156 | 38 | 7 | 67.6 | 30.6 | 1.8 |
| 719 | 65.77 | 25.69 | 8.12 | <0.05 | 0.24 | <0.05 | 0.23 | <0.05 | 115 | 51 | 24 | 66.0 | 25.8 | 8.2 |
| A2-5 | 65.69 | 18.74 | 13.78 | 0.18 | 0.16 | <0.05 | 0.10 | 0.14 | 150 | 48 | 60 | 66.9 | 19.1 | 14.0 |
| B3-4A | 65.50 | 25.81 | 4.88 | 2.05 | 0.28 | 0.12 | 0.16 | 0.24 | 82 | 52 | 16 | | | |
| A2-8 | 65.33 | 16.86 | 14.24 | 0.22 | 0.13 | <0.05 | 0.14 | 1.17 | 181 | 54 | 84 | 67.7 | 17.5 | 14.8 |
| 718 | 65.23 | 27.14 | 6.95 | <0.05 | 0.24 | <0.05 | 0.20 | 0.49 | 107 | 47 | 20 | 65.7 | 27.3 | 7.0 |
| B3-14 | 65.11 | 24.91 | 5.54 | 0.58 | 0.43 | 0.09 | 0.19 | 0.61 | 158 | 67 | 27 | 68.1 | 26.1 | 5.8 |
| 721 | 65.08 | 27.26 | 5.33 | 0.06 | 0.17 | <0.05 | 0.08 | <0.05 | 153 | 68 | 20 | 66.6 | 27.9 | 5.5 |
| A2-34 | 64.85 | 6.63 | 26.20 | 0.23 | 0.06 | <0.05 | 0.16 | 0.80 | 39 | 11 | 119 | 66.4 | 6.8 | 26.8 |
| A2-21 | 64.16 | 13.74 | 19.98 | 0.34 | 0.17 | <0.05 | 0.11 | 0.13 | 160 | 28 | 56 | 65.6 | 14.0 | 20.4 |
| B3-30 | 64.13 | 31.93 | 0.37 | 0.64 | 0.45 | 0.09 | 0.14 | 0.28 | 163 | 83 | 3 | 66.5 | 33.1 | 0.4 |
| A2-35 | 64.12 | 8.88 | 24.88 | 0.29 | 0.10 | <0.05 | 0.13 | 0.47 | 61 | 18 | 106 | 65.5 | 9.1 | 25.4 |
| B3-23 | 64.09 | 23.26 | 9.33 | 0.56 | 0.36 | 0.09 | 0.16 | 0.30 | 101 | 44 | 31 | 66.3 | 24.0 | 9.7 |
| B3-5A | 63.74 | 25.41 | 4.68 | 3.97 | 0.26 | 0.12 | 0.17 | 0.58 | 48 | 43 | 11 | | | |
| A2-30 | 63.68 | 16.06 | 18.21 | 0.40 | 0.11 | 0.07 | 0.15 | <0.05 | 102 | 33 | 52 | 65.0 | 16.4 | 18.6 |
| A2-9 | 63.66 | 21.44 | 12.96 | 1.49 | 0.32 | 0.10 | 0.11 | <0.05 | 195 | 67 | 66 | 64.9 | 21.9 | 13.2 |
| A2-12 | 63.56 | 16.55 | 18.00 | 0.33 | 0.11 | <0.05 | 0.08 | 0.05 | 160 | 47 | 66 | 64.8 | 16.9 | 18.3 |
| B3-6A | 63.24 | 24.83 | 4.59 | 5.70 | 0.27 | 0.11 | 0.15 | 0.15 | 26 | 7 | 26 | | | |
| 723 | 62.61 | 29.79 | 5.44 | <0.05 | 0.17 | <0.05 | 0.13 | <0.05 | 141 | 62 | 17 | 64.0 | 30.4 | 5.6 |
| 757 | 62.60 | 20.92 | 15.22 | 0.20 | <0.05 | <0.05 | 0.16 | <0.05 | 187 | 62 | 73 | 63.4 | 21.2 | 15.4 |
| A2-25 | 62.36 | 10.99 | 24.18 | 0.33 | 0.10 | 0.05 | 0.16 | 0.07 | 160 | 35 | 105 | 63.9 | 11.3 | 24.8 |
| B3-13 | 62.33 | 30.62 | 2.06 | 0.55 | 0.65 | 0.09 | 0.17 | 0.91 | 151 | 41 | 7 | 65.6 | 32.2 | 2.2 |
| A2-7 | 61.98 | 23.37 | 11.98 | 0.44 | 0.25 | <0.05 | 0.10 | 0.23 | 178 | 59 | 63 | 63.7 | 24.0 | 12.3 |
| 725 | 61.83 | 28.13 | 7.54 | 0.10 | 0.36 | <0.05 | 0.17 | <0.05 | 186 | 76 | 35 | 63.4 | 28.9 | 7.7 |
| B3-11 | 61.71 | 33.25 | 2.33 | 0.69 | 0.52 | 0.12 | 0.25 | 0.59 | 162 | 28 | 15 | 63.4 | 34.2 | 2.4 |
| B3-24 | 61.62 | 25.53 | 9.73 | 0.58 | 0.38 | 0.10 | 0.17 | <0.05 | 185 | 37 | 57 | 63.6 | 26.4 | 10.0 |
| A2-24 | 61.38 | 13.62 | 22.74 | 0.31 | 0.16 | <0.05 | 0.14 | 0.08 | 136 | 27 | 87 | 62.8 | 13.9 | 23.3 |
| 722 | 61.33 | 31.08 | 5.25 | 0.05 | 0.20 | <0.05 | 0.16 | <0.05 | 185 | 81 | 23 | 62.8 | 31.8 | 5.4 |
| 924 | 61.32 | 19.78 | 14.54 | 2.57 | <0.05 | <0.05 | 0.09 | 0.66 | 77 | 36 | 37 | 64.1 | 20.7 | 15.2 |
| B3-2A | 60.83 | 32.30 | 0.48 | 4.15 | 0.35 | 0.15 | 0.19 | 0.12 | 58 | 61 | 5 | | | |
| A2-14 | 60.74 | 25.30 | 11.66 | 0.28 | 0.18 | 0.05 | 0.13 | 0.16 | 127 | 57 | 43 | 62.2 | 25.9 | 11.9 |

TABLE 10-continued

| Melt | Analysed Compositions (Weight %) | | | | | | | | Solubilities ppm | | | Rationalised Compositions | | |
|---|---|---|---|---|---|---|---|---|---|---|---|---|---|---|
| | SiO$_2$ % | CaO % | MgO % | Al$_2$O$_3$ % | Na$_2$O % | K$_2$O % | Fe$_2$O$_3$ % | ZrO$_2$ % | SiO$_2$ | CaO | MgO | SiO$_2$ % | CaO % | MgO % |
| B3-1A | 60.32 | 32.27 | 3.99 | 1.74 | 0.32 | 0.10 | 0.15 | 0.09 | 119 | 72 | 16 | | | |
| A2-11 | 60.32 | 24.28 | 13.24 | 0.25 | 0.18 | <0.05 | 0.09 | 0.08 | 149 | 54 | 51 | 61.7 | 24.8 | 13.5 |
| B3-9 | 60.28 | 34.49 | 2.50 | 0.76 | 0.50 | 0.13 | 0.28 | 0.49 | 175 | 8 | 5 | 62.0 | 35.4 | 2.6 |
| A2-23 | 60.20 | 18.59 | 18.78 | 0.48 | 0.19 | 0.08 | 0.15 | 0.05 | 192 | 35 | 47 | 61.7 | 19.1 | 19.2 |
| B3-1 | 60.11 | 32.56 | 3.80 | 0.79 | 0.54 | 0.12 | 0.23 | 0.82 | 146 | 84 | 17 | 62.3 | 33.8 | 3.9 |
| 932 | 59.85 | 21.60 | 15.65 | 1.50 | 0.06 | <0.05 | 0.18 | 0.11 | 92 | 41 | 43 | 61.6 | 22.3 | 16.1 |
| 692 | 59.82 | 34.34 | 5.44 | 0.13 | 0.19 | <0.05 | 0.08 | 0.17 | 140 | 67 | 23 | 60.0 | 34.5 | 5.5 |
| B3-3A | 59.54 | 31.64 | 0.67 | 5.91 | 0.33 | 0.15 | 0.21 | 0.41 | 30 | 25 | 10 | | | |
| B3-25 | 59.53 | 28.15 | 9.22 | 0.48 | 0.39 | 0.08 | 0.14 | <0.05 | 133 | 48 | 33 | 61.4 | 29.1 | 9.5 |
| B3-29 | 59.40 | 36.00 | 0.68 | 0.92 | 0.43 | 0.14 | 0.23 | 0.17 | 201 | 29 | 5 | 61.8 | 37.5 | 0.7 |
| 714 | 59.05 | 32.00 | 8.27 | <0.05 | 0.27 | <0.05 | 0.40 | <0.05 | 142 | 73 | 30 | 59.5 | 32.2 | 8.3 |
| 696 | 58.81 | 30.91 | 6.15 | 0.21 | 0.18 | <0.05 | 0.08 | 0.24 | 163 | 48 | 37 | 61.3 | 32.3 | 6.4 |
| A2-19 | 58.71 | 18.48 | 19.74 | 0.54 | 0.20 | 0.07 | 0.19 | <0.05 | 125 | 42 | 66 | 60.6 | 19.0 | 20.4 |
| 586 | 58.65 | 35.03 | 3.90 | 0.13 | 0.23 | <0.05 | 0.16 | <0.05 | 182 | 54 | 19 | 60.1 | 35.9 | 4.0 |
| 694 | 58.39 | 33.10 | 6.02 | 0.27 | 0.20 | <0.05 | 0.10 | 0.17 | 133 | 66 | 27 | 59.9 | 33.9 | 6.2 |
| 765 | 57.78 | 3.90 | 35.07 | 2.12 | <0.05 | <0.05 | 0.23 | <0.05 | 100 | 16 | 169 | 59.7 | 4.0 | 36.3 |
| 660 | 57.74 | 34.65 | 4.83 | 1.15 | 0.24 | <0.05 | 0.19 | <0.05 | 152 | 69 | 23 | 59.4 | 35.6 | 5.0 |
| B3-20 | 57.57 | 32.70 | 6.07 | 0.91 | 0.57 | 0.13 | 0.22 | <0.05 | 181 | 29 | 40 | 59.8 | 33.9 | 6.3 |
| 712 | 57.54 | 35.39 | 4.61 | 0.06 | 0.23 | <0.05 | 0.12 | <0.05 | 160 | 24 | 22 | 59.0 | 36.3 | 4.7 |
| B3-21 | 57.38 | 36.62 | 2.43 | 0.73 | 0.51 | 0.11 | 0.16 | 0.08 | 175 | 25 | 16 | 59.5 | 38.0 | 2.5 |
| B3-26 | 56.98 | 30.50 | 9.44 | 0.62 | 0.44 | 0.11 | <0.05 | <0.05 | 149 | 64 | 41 | 58.8 | 31.5 | 9.7 |
| A2-18 | 56.96 | 26.29 | 13.01 | 0.66 | 0.51 | 0.10 | 0.19 | <0.05 | 161 | 47 | 57 | 59.2 | 27.3 | 13.5 |
| 971 | 56.82 | 23.92 | 17.36 | 0.74 | 0.18 | <0.05 | 0.14 | 0.05 | 142 | 55 | 73 | 57.9 | 24.4 | 17.7 |
| 734 | 56.58 | 23.62 | 17.05 | 1.00 | 0.06 | <0.05 | 0.13 | 0.05 | 135 | 52 | 66 | 58.2 | 24.3 | 17.5 |
| 973 | 56.18 | 24.45 | 16.81 | 0.50 | 0.08 | <0.05 | 0.14 | 0.05 | 102 | 42 | 47 | 57.7 | 25.1 | 17.2 |
| B3-3 | 55.99 | 36.07 | 4.44 | 0.58 | 0.45 | 0.09 | 0.38 | 1.46 | 185 | 14 | 18 | 58.0 | 37.4 | 4.6 |
| 708 | 55.22 | 42.79 | 0.77 | <0.05 | 0.31 | <0.05 | 0.12 | <0.05 | 193 | 31 | 2 | 55.9 | 43.3 | 0.8 |
| 71 | 54.68 | 24.04 | 19.66 | 0.20 | 0.17 | <0.05 | 0.23 | <0.05 | 133 | 55 | 62 | 55.6 | 24.4 | 20.0 |

There are several anomalies, namely compositions B3-6A, A2-25, A2-24, A2-23, B3-2A, B3-3A, A2-19, and 932. All of these have an SiO$_2$ content of >58% but a high shrinkage.

On the assumption that the minimum silica level for satisfactory shrinkage varies with MgO content the applicants have determined that Libres with a silica content (in weight percent) that fail to meet the following expression do not have satisfactory shrinkages at either or both 800° C. and 1000° C:

| SiO$_2$ | >58% | (for MgO =< 10%) and |
|---|---|---|
| SiO$_2$ | >58% + 0.5 (% MgO −10) | (for MgO >= 10%) |

The applicants have further found that the Al$_2$O$_3$ content is important. From their studies it appears that the maximum Al$_2$O$_3$ content lies somewhere between 2.57% and 3.97%. The applicants have found that with increasing alumina levels the first material to crystallise is calcium aluminate and this possibly forms a liquid phase that assists flow and hence shrinkage.

Table 10 shows, for the same compositions as Table 9, 24 hour solubilities for each major constituent. It can be seen that all of the compositions have high solubilities.

As mentioned above use of CaO in forming calcium containing fibres is inconvenient and can be hazardous. The applicants investigated use of mixed oxide materials that would avoid the handling of CaO. A fibre was made by admixture of magnesia with silica and wollastonite (CaSiO$_3$).

The raw materials used to make the melt comprised:

Pennine Darlington Heavy Magnesia (#200)

| MgO | 92.60% |
|---|---|
| CaO | 1.75% |
| Fe$_2$O$_3$ | 0.04% |
| SiO$_2$ | 0.20% |
| Cl | 0.25% |
| SO$_3$ | 0.70% |
| LOI | 4.50% |

Partek's Finnish Low Iron Wollastonite (#200) (U.K. agent—Cornelius Chemical Co., Romford, Essex)

| SiO$_2$ | 51.80% |
|---|---|
| CaO | 44.50% |
| MgO | 0.80% |
| Al$_2$O$_3$ | 0.60% |
| Fe$_2$O$_3$ | 0.30% |
| Na$_2$O | 0.10% |
| K$_2$O | 0.05% |
| TiO$_2$ | 0.05% |
| S | 0.02% |
| MnO | 0.01% |
| P | 0.01% |
| F | 0.01% |
| LOI | 1.70% |

Hepworth Mineral's Redhill T washed silica sand

| SiO$_2$ | 99.0% min. |
|---|---|

These constituents were mixed as 78.65% Wollastonite; 19.25% SiO$_2$; and 3.6% MgO. This gave 0.4–0.5% of the final melt as Al$_2$O$_3$.

It was surprisingly found that in producing a melt using these constituents the current requirements were only two-thirds that for the use of the raw oxides.

Fibre was produced by blowing (although spinning and other methods can be used). 2 runs were performed with different blowing conditions.

Chemical analysis was undertaken by the Analytical Department at the applicant's subsidiary Morgan Materials Technology (hereinafter called M²T) using wet chemical techniques. Fibre diameters were measured using M²T's Galai particle analyser, with shape analysis software. Typically 40,000 fibres were analysed for each run.

The first result of note was the speed of melt reaction when using wollastonite as compared with lime. Also the current was seen to be very stable throughout the growth of the melt. If the current was lost whilst pulling the electrodes apart the current could be restored simply by pushing them back together again. This was not possible with the runs using lime.

Chemical Analysis

|  | Others | CaO | MgO | $Al_2O_3$ | $SiO_2$ | $ZrO_2$ | $Na_2O$ | Total |
|---|---|---|---|---|---|---|---|---|
| Run1 | 0.7 | 32.6 | 3.8 | 0.8 | 60.1 | 0.8 | 0.5 | 99.3 |
| Run2 | 0.7 | 32.5 | 3.8 | 0.8 | 60.1 | 0.8 | 0.6 | 99.3 |

Runs 1 and 2 indicate the respective x-ray fluorescence analyses for each run.

Shrinkage Results (1000° C. for 24 hours)

|  | L1 | L2 | L3 | L4 | Av. | Std. Dev. |
|---|---|---|---|---|---|---|
| Run 1 | 0.9 | 0.2 | 0.4 | 0.6 | 0.5 | 0.3 |
| Run 2 (A) | 1.0 | −0.2 | 0.7 | 0.6 | 0.5 | 0.5 |
| Run 2 (B) | 0.5 | 0.2 | 0.0 | 0.4 | 0.2 | 0.2 |

Solubility Results (ppm)

|  | CaO | MgO | $SiO_2$ |
|---|---|---|---|
| Run 1 (5 hr) | 67 | 10 | 95 |
| Run 1 (24 hr) | 84 | 17 | 146 |
| Run 2 (5 hr) | 39 | 7 | 72 |
| Run 2 (24 hr) | 73 | 17 | 186 |

Fibre diameters

|  | Mean | Median | 100%< | % >5 $\mu$m | % <1 $\mu$m |
|---|---|---|---|---|---|
| Run 1 | 5.1 $\mu$m | 3.4 $\mu$m | 30 $\mu$m | 33% | 13% |
| Run 2 | 4.1 $\mu$m | 2.7 $\mu$m | 25 $\mu$m | 25% | 19% |

Accordingly it appears to be the case that by using what are cheaper ingredients than the pure oxides one can obtain a fibre that has as high a performance as using purer oxides and at much improved energy costs and safety. It is to be noted that this feature of the invention is not limited to saline soluble fibres and any oxide fibre that contains both calcium and silicon can advantageously be made with a calcium silicate, wollastonite being merely an example of such a silicate.

The previous description is directed towards high temperature usage of particular saline soluble fibres. The following is directed towards the prediction and use of saline soluble fibres. A series of fritted glass melts were made of the compositions shown in Tables 11A and 11B and quenched in water. Solubilities of the various components of the quenched melt were measured by the previously described method of atomic absorption. The solubilities were normalised to a specific surface area of 0.25 m²/gram of fibre.

Figure 4:
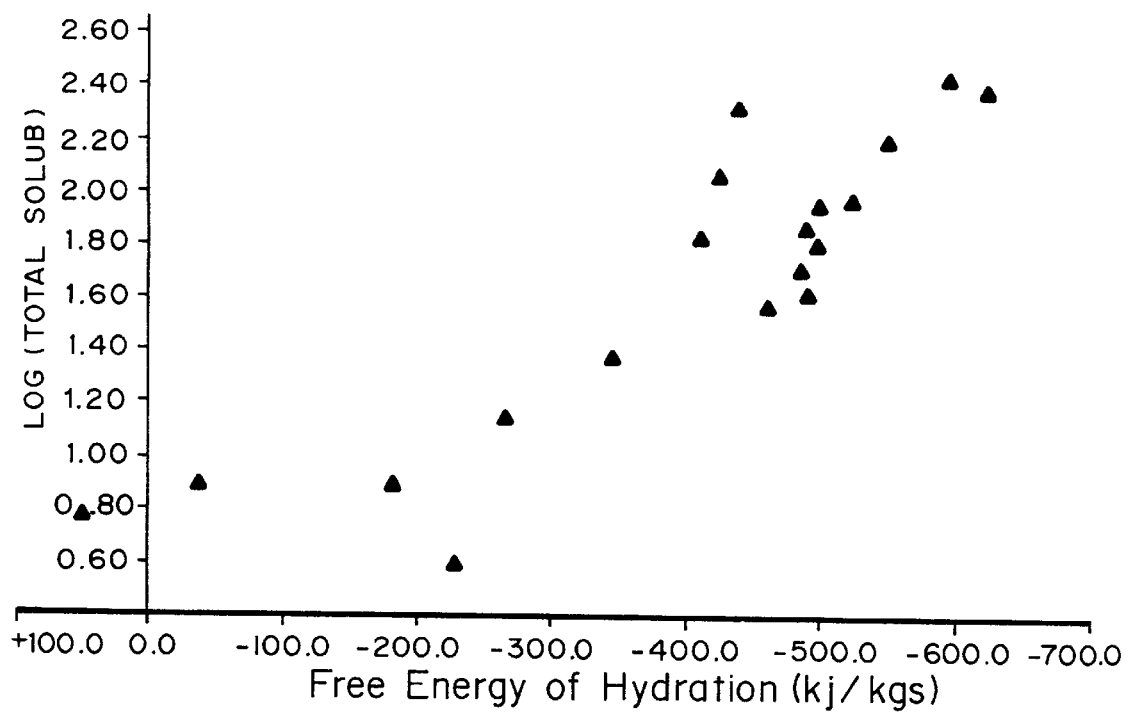
FIG. 4 is a plot of log (total solubility) v calculated free energy of hydration for a series of fibres.

The free energy of hydration was calculated by normalising the chemical analysis to 100 weight %; making the assumption that simple silicates ($MSiO_3$/$M_2SiO_3$) are present and calculating the free energy of hydration contribution of each species; and summing to get the total free energy of hydration. The data in Tables 11A & 11B is also presented in FIG. 4. It can be seen that the fibres lie on a generally straight line bar four groups of materials that will be explained below.

Table 11 shows in each column the following:

Fibre Reference

Composition

Molar ratios

Moles/100 grams of melt

Species assumed (see below)

Calculated free energy of hydration of assumed species (kcal/100 grams)(see below)

Calculated free energy of hydration of assumed species (kJ/kg) (see below)

Solubility data (# indicates not measured [see below])

Specific surface area

Normalised solubility data log normalised solubility

The base data on which calculation of the free energy of hydration was done is set out in Tables 12 which indicates free energies of hydration taken from the literature in the units kcal/mol and kJ/mol.

TABLE 11

Table of Free Energy of Hydration Values for Silicate Melts

| Melt Code | Composition | | | Moles | | Moles | |
|---|---|---|---|---|---|---|---|
|  | Oxide | Wt. % | Rationalized | Moles | in 100 g | Species | in 1 kg |
| CAS10(B) - A | CaO | 47.2 | 47.8 | 0.852 | 0.451 | $CaSiO_3$ | 4.51 |
|  | Al2O3 | 24.5 | 24.8 | 0.243 | 0.243 | Al2O3 | 2.43 |
|  | SiO2 | 27.1 | 27.4 | 0.451 | 0.401 | CaO | 4.01 |
|  | Total | 98.8 | 100.0 |  |  |  |  |
| CAS10(B) - B | CaO | 46.5 | 47.2 | 0.842 | 0.479 | $CaSiO_3$ | 4.79 |
|  | Al2O3 | 23.7 | 24.0 | 0.235 | 0.235 | Al2O3 | 2.35 |

TABLE 11-continued

Table of Free Energy of Hydration Values for Silicate Melts

| | | | | | | | |
|---|---|---|---|---|---|---|---|
| | SiO2 | 28.4 | 28.8 | 0.479 | 0.363 | CaO | 3.63 |
| | Total | 98.6 | 100.0 | | | | |
| CAS10(B) - C | CaO | 47.8 | 48.4 | 0.863 | 0.456 | CaSiO3 | 4.56 |
| | Al2O3 | 23.9 | 24.2 | 0.237 | 0.237 | Al2O3 | 2.37 |
| | SiO2 | 27.1 | 27.4 | 0.456 | 0.407 | CaO | 4.07 |
| | Total | 98.8 | 100.0 | | | | |
| CIS(A) | CaO | 42.7 | 44.3 | 0.790 | 0.707 | CaSiO3 | 7.07 |
| | TiO2 | 12.7 | 13.2 | 0.165 | 0.083 | CaO | 0.83 |
| | SiO2 | 41.0 | 42.5 | 0.707 | 0.165 | TiO2 | 1.65 |
| | Total | 96.4 | 100.0 | | | | |
| SrSiO3 | SrO | 63.1 | 64.4 | 0.622 | 0.592 | SrSiO3 | 5.92 |
| | SiO2 | 34.9 | 35.6 | 0.592 | 0.030 | SrO | 0.30 |
| | Total | 98.0 | 100.0 | | | | |
| CaSiO3 | CaO | 46.1 | 46.9 | 0.836 | 0.836 | CaSiO3 | 8.36 |
| | SiO2 | 52.3 | 53.1 | 0.884 | 0.048 | SiO2 | 0.48 |
| | Total | 98.4 | 100.0 | | | | |
| NAS(A) | Na2O | 18.8 | 18.9 | 0.305 | 0.305 | Na2SiO3 | 3.05 |
| | Al2O3 | 39.7 | 39.8 | 0.390 | 0.390 | Al2O3 | 3.90 |
| | SiO2 | 41.1 | 41.3 | 0.687 | 0.382 | SiO2 | 3.82 |
| | Total | 99.6 | 100.0 | | | | |
| CAS4 | CaO | 21.0 | 20.9 | 0.373 | 0.373 | CaSiO3 | 3.73 |
| | Al2O3 | 35.4 | 35.2 | 0.345 | 0.345 | Al2O3 | 3.45 |
| | SiO2 | 44.2 | 43.9 | 0.731 | 0.358 | SiO2 | 7.31 |
| | Total | 100.6 | 100.0 | | | | |
| MAS(B) | MgO | 10.0 | 10.3 | 0.256 | 0.256 | MgSiO3 | 2.56 |
| | Al2O3 | 33.7 | 34.9 | 0.342 | 0.342 | Al2O3 | 3.42 |
| | SiO2 | 53.0 | 54.8 | 0.912 | 0.656 | SiO2 | 6.56 |
| | Total | 96.7 | 100.0 | | | | |
| SAS(A) | SrO | 29.8 | 30.5 | 0.294 | 0.294 | SrSiO3 | 2.94 |
| | Al2O3 | 31.1 | 31.8 | 0.312 | 0.312 | Al2O3 | 3.12 |
| | SiO2 | 36.8 | 37.7 | 0.627 | 0.333 | SiO2 | 3.33 |
| | Total | 97.7 | 100.0 | | | | |
| SCS(A) | SrO | 35.0 | 35.1 | 0.339 | 0.339 | SrSiO3 | 3.39 |
| | CoO | 21.0 | 21.1 | 0.376 | 0.376 | CaSiO3 | 3.76 |
| | SiO2 | 43.6 | 43.8 | 0.729 | 0.014 | SiO2 | 0.14 |
| | Total | 99.6 | 100.0 | | | | |
| SMAS(A) | SrO | 55.0 | 56.6 | 0.546 | 0.296 | SrSiO3 | 2.96 |
| | MgO | 1.2 | 1.2 | 0.030 | 0.030 | MgO | 0.30 |
| | Al2O3 | 23.7 | 24.4 | 0.239 | 0.239 | Al2O3 | 2.39 |
| | SiO2 | 17.3 | 17.8 | 0.296 | 0.250 | SrO | 2.50 |
| | Total | 97.2 | 100.0 | | | | |
| SMAS(B) | SrO | 55.0 | 55.9 | 0.539 | 0.401 | SrSiO3 | 4.01 |
| | MgO | 4.8 | 4.9 | 0.122 | 0.122 | MgO | 1.22 |
| | Al2O3 | 14.8 | 15.1 | 0.148 | 0.148 | Al2O3 | 1.48 |
| | SiO2 | 23.7 | 24.1 | 0.401 | 0.138 | SrO | 1.38 |
| | Total | 98.3 | 100.0 | | | | |
| SMS(A) | SrO | 33.0 | 32.9 | 0.318 | 0.318 | SrSiO3 | 3.18 |
| | MgO | 12.5 | 12.5 | 0.310 | 0.310 | MgSiO3 | 3.10 |
| | Al2O3 | 1.0 | 1.0 | 0.010 | 0.010 | Al2O3 | 0.10 |
| | SiO2 | 53.8 | 53.6 | 0.892 | 0.264 | SiO2 | 2.64 |
| | Total | 100.3 | 100.0 | | | | |
| SAS(C) | SrO | 56.0 | 56.2 | 0.542 | 0.401 | SrSiO3 | 4.01 |
| | Al2O3 | 19.7 | 19.7 | 0.193 | 0.193 | Al2O3 | 1.93 |
| | SiO2 | 24.0 | 24.1 | 0.401 | 0.141 | SrO | 1.41 |
| | Total | 99.7 | 100.0 | | | | |
| CMAS(A) | CaO | 35.0 | 34.6 | 0.617 | 0.293 | CaSiO3 | 2.93 |
| | MgO | 4.5 | 4.4 | 0.109 | 0.109 | MgO | 1.09 |
| | Al2O3 | 44.0 | 43.4 | 0.426 | 0.426 | Al2O3 | 4.26 |
| | SiO2 | 17.8 | 17.6 | 0.293 | 0.324 | CaO | 3.24 |
| | Total | 101.3 | 100.0 | | | | |
| SWA2 | CaO | 21.7 | 21.7 | 0.387 | 0.387 | CaSiO3 | 3.87 |
| | MgO | 15.7 | 15.7 | 0.389 | 0.389 | MgSiO3 | 3.89 |

TABLE 11-continued

Table of Free Energy of Hydration Values for Silicate Melts

|  |  |  |  |  |  |  |  |
|---|---|---|---|---|---|---|---|
|  | Al2O3 | 0.8 | 0.8 | 0.008 | 0.008 | Al2O3 | 0.08 |
|  | SiO2 | 61.8 | 61.8 | 1.028 | 0.252 | SiO2 | 2.52 |
|  | Total | 100.0 | 100.0 |  |  |  |  |
| SAS(D) | SrO | 56.5 | 57.3 | 0.553 | 0.413 | SrSiO3 | 4.13 |
|  | Al2O3 | 17.6 | 17.9 | 0.176 | 0.176 | Al2O3 | 1.76 |
|  | SiO2 | 24.4 | 24.8 | 0.413 | 0.140 | SrO | 1.40 |
|  | Total | 98.5 | 100.0 |  |  |  |  |
| KHAS(A) | K2O | 16.5 | 16.5 | 0.175 | 0.175 | K2SiO3 | 1.75 |
|  | MgO | 13.0 | 13.0 | 0.323 | 0.323 | MgSiO3 | 3.23 |
|  | Al2O3 | 18.0 | 17.9 | 0.176 | 0.176 | Al2O3 | 1.76 |
|  | SiO2 | 52.8 | 52.6 | 0.875 | 0.377 | SiO2 | 8.75 |
|  | Total | 100.3 | 100.0 |  |  |  |  |

| Melt Code | Free Energy of Hydration (kcal/100 g) | Free Energy of Hydration (kJ/kg) | Solubility Oxide | Solubility (ppm) | S.S.A m2/g | Normalized Solubility | Log (norm solub) |
|---|---|---|---|---|---|---|---|
| CAS10(B) - A | -7.3 | -304.0 | CaO | 44 | 0.30 | 43 | 1.63 |
|  | 0.8 | 31.6 | Al2O3 | 0 |  |  |  |
|  | -5.3 | -219.7 | SiO2 | 7 |  |  |  |
|  | -11.8 | -492.1 | Total | 51 |  |  |  |
| CAS10(B) - B | -7.7 | -322.8 | CaO | 58 | 0.39 | 66 | 1.82 |
|  | 0.7 | 30.6 | Al2O3 | 1 |  |  |  |
|  | -4.8 | -198.9 | SiO2 | 44 |  |  |  |
|  | -11.8 | -491.1 | Total | 103 |  |  |  |
| CAS10(B) - C | -7.3 | -307.3 | CaO | 55 | 0.36 | 76 | 1.88 |
|  | 0.7 | 30.8 | Al2O3 | 0 |  |  |  |
|  | -5.3 | -223.0 | SiO2 | 55 |  |  |  |
|  | -11.9 | -499.5 | Total | 110 |  |  |  |
| CIS(A) | -11.4 | -476.5 | CaO | 62 | 0.40 | 69 | 1.84 |
|  | -1.1 | -45.5 | TiO2 | 0 |  |  |  |
|  | 2.6 | 110.4 | SiO2 | 49 |  |  |  |
|  | -9.9 | -411.6 | Total | 111 |  |  |  |
| SrSiO3 | -14.4 | -604.4 | SrO | 2 | 0.37 | 249 | 2.40 |
|  | -0.5 | -21.7 | SiO2 | 367 |  |  |  |
|  | -14.9 | -626.1 | Total | 369 |  |  |  |
| CaSiO3 | -13.5 | -563.5 | CaO | 41 | 0.45 | 163 | 2.21 |
|  | 0.3 | 11.2 | SiO2 | 253 |  |  |  |
|  | -13.2 | -552.3 | Total | 294 |  |  |  |
| NAS(A) | -8.8 | -367.5 | Na2O | # | 0.56 | 4 | 0.60 |
|  | 1.2 | 50.7 | Al2O3 | 4 |  |  |  |
|  | 2.1 | 89.7 | SiO2 | 5 |  |  |  |
|  | -5.5 | -227.4 | Total | 9 |  |  |  |
| CAS4 | -6.0 | -251.4 | CaO | 11 | 0.62 | 8 | 0.90 |
|  | 1.1 | 44.9 | Al2O3 | 4 |  |  |  |
|  | 2.0 | 171.1 | SiO2 | 5 |  |  |  |
|  | -2.9 | -35.4 | Total | 20 |  |  |  |
| MAS(B) | -3.6 | -149.0 | MgO | 7 | 0.52 | 6 | 0.78 |
|  | 1.1 | 44.5 | Al2O3 | 2 |  |  |  |
|  | 3.7 | 153.5 | SiO2 | 4 |  |  |  |
|  | 1.2 | 49.0 | Total | 13 |  |  |  |
| SAS(A) | -7.2 | -300.2 | SrO | 9 | 0.50 | 8 | 0.90 |
|  | 1.0 | 40.6 | Al2O3 | 2 |  |  |  |
|  | 1.9 | 77.9 | SiO2 | 5 |  |  |  |
|  | -4.3 | -181.7 | Total | 16 |  |  |  |
| SCS(A) | -8.3 | -346.1 | SrO | 75 | 0.41 | 280 | 2.45 |
|  | -6.1 | -253.4 | CaO | 30 |  |  |  |
|  | 0.1 | 3.3 | SiO2 | 355 |  |  |  |
|  | -14.3 | -596.2 | Total | 460 |  |  |  |
| SMAS(A) | -7.2 | -302.2 | SrO | 57 | 0.46 | 38 | 1.58 |
|  | -0.2 | -8.2 | MgO | 2 |  |  |  |

TABLE 11-continued

Table of Free Energy of Hydration Values for Silicate Melts

|  |  |  |  |  |  |  |  |
|---|---|---|---|---|---|---|---|
|  | 0.7 | 31.1 | Al2O3 | 5 |  |  |  |
|  | −4.3 | −181.0 | SiO2 | 5 |  |  |  |
|  | −11.0 | −460.3 | Total | 69 |  |  |  |
| SMAS(B) | −9.8 | −409.4 | SrO | 110 | 0.39 | 95 | 1.98 |
|  | −0.8 | −33.2 | MgO | 15 |  |  |  |
|  | 0.5 | 19.2 | Al2O3 | 1 |  |  |  |
|  | −2.4 | −99.9 | SiO2 | 22 |  |  |  |
|  | −12.5 | −523.3 | Total | 148 |  |  |  |
| SMS(A) | −7.8 | −324.7 | SrO | 147 | 0.39 | 212 | 2.33 |
|  | −4.3 | −180.4 | MgO | 61 |  |  |  |
|  | 0.0 | 1.3 | Al2O3 | 0 |  |  |  |
|  | 1.5 | 61.8 | SiO2 | 123 |  |  |  |
|  | −10.6 | −442.0 | Total | 331 |  |  |  |
| SAS(C) | −9.8 | −409.4 | SrO | 70 | 0.38 | 52 | 1.72 |
|  | 0.6 | 25.1 | Al2O3 | 1 |  |  |  |
|  | −2.4 | −102.1 | SiO2 | 8 |  |  |  |
|  | −11.6 | −486.4 | Total | 79 |  |  |  |
| CMAS(A) | −4.7 | −197.5 | CaO | 11 | 0.30 | 24 | 1.38 |
|  | −0.7 | −29.6 | MgO | 7 |  |  |  |
|  | 1.3 | 55.4 | Al2O3 | 3 |  |  |  |
|  | −4.2 | −177.6 | SiO2 | 8 |  |  |  |
|  | −8.3 | −349.3 | Total | 29 |  |  |  |
| SWA2 | −6.2 | −260.8 | CaO | 53 | 0.48 | 119 | 2.08 |
|  | −5.4 | −226.4 | MgO | 57 |  |  |  |
|  | 0.0 | 1.0 | Al2O3 | 0 |  |  |  |
|  | 1.4 | 59.0 | SiO2 | 118 |  |  |  |
|  | −10.2 | −427.2 | Total | 228 |  |  |  |
| SAS(D) | −10.1 | −421.7 | SrO | 107 | 0.40 | 92 | 1.96 |
|  | 0.5 | 22.9 | Al2O3 | 1 |  |  |  |
|  | −2.4 | −101.4 | SiO2 | 39 |  |  |  |
|  | −12.0 | −500.2 | Total | 147 |  |  |  |
| KHAS(A) | −7.3 | −305.4 | K2O | # | 0.36 | 14 | 1.15 |
|  | −2.1 | −188.0 | MgO | 8 |  |  |  |
|  | 0.5 | 22.9 | Al2O3 | 1 |  |  |  |
|  | 2.1 | 204.8 | SiO2 | 11 |  |  |  |
|  | −6.8 | −265.7 | Total | 20 |  |  |  |

TABLE 12

|  | $G_{hyd}$ | |
|---|---|---|
|  | (kcal/mole) | (kJ/mol) |
| Relevant oxides |  |  |
| $SiO_2 + H_2O \rightarrow H_2SiO_3$ (vitreous silica) | 5.6 | 23.4 |
| $Al_2O_3 + 3H_2O \rightarrow 2Al(OH)_3$ | 3.1 | 13.0 |
| $MgO + H_2O \rightarrow Mg(OH)_2$ | −6.5 | −27.2 |
| $CaO + H_2O \rightarrow Ca(OH)_2$ | −13.1 | −54.8 |
| $SrO + H_2O \rightarrow Sr(OH)_2$ | −17.3 | −72.4 |
| $Na_2O + H_2O \rightarrow 2NaOH$ | −33.5 | −140.2 |
| $K_2O + H_2O \rightarrow 2KOH$ | −46.1 | −192.9 |
| $TiO_2 + H_2O \rightarrow Ti(OH)_2O$ | 16.0 | 66.9 |
| $P_2O_5 + 3H_2O \rightarrow 2H_3PO_4$ | −55.9 | −233.9 |
| $B_2O_3 + 3H_2O \rightarrow 2H_3BO_3$ | −9.8 | −41.0 |
| $ZrO_2 + H_2O \rightarrow Zr(OH)_2O$ | −7.1 | −29.7 |
| Relevant Silicates |  |  |
| $Na_2SiO_3 + 2H^+ (aq) \rightarrow H_2SiO_3 + 2Na^+ (aq)$ | −28.8 | −120.5 |
| $K_2SiO_3 + 2H^+ (aq) \rightarrow H_2SiO_3 + 2K^+ (aq)$ | −41.7 | −174.5 |
| $MgSiO_3 + 2H^+ (aq) \rightarrow H_2SiO_3 + Mg^{2+} (aq)$ | −13.9 | −58.2 |
| $CaSiO_3 + 2H^+ (aq) \rightarrow H_2SiO_3 + Ca^{2+} (aq)$ | −16.1 | −67.4 |
| $SrSiO_3 + 2H^+ (aq) \rightarrow H_2SiO_3 + Sr^{2+} (aq)$ | −24.4 | −102.1 |
| $BaSiO_3 + 2H^+ (aq) \rightarrow H_2SiO_3 + Ba^{2+} (aq)$ | −37.3 | −156.1 |
| $ZnSiO_3 + 2H^+ (aq) \rightarrow H_2SiO_3 + Zn^{2+} (aq)$ | −2.4 | −10.0 |
| Disilicates |  |  |
| $Ca_2SiO_4 + 3H^+ (aq) \rightarrow H_2SiO_3 + 2Ca^{2+} + OH^-$ | −30.3 | −126.8 |
| $Sr_2SiO_4 + 3H^+ (aq) \rightarrow H_2SiO_3 + 2Sr^{2+} + OH^-$ | −50.3 | −210.5 |
| $Mg_2SiO_4 + 3H^+ (aq) \rightarrow H_2SiO_3 + 2Mg^{2+} + OH^-$ | −17.9 | −74.9 |

Although calculations were undertaken assuming the presence of the simplest silicates choice of other silicates (such as disilicates) does not appear to change the calculations much. For example given below is the calculation for an assumed composition which shows only minor differences for the free energy of hydration calculated.

| Composition (moles/100 g) |  | 0.767 CaO |  |
|---|---|---|---|
|  |  | 0.417 MgO |  |
|  |  | 0.669 SiO$_2$ |  |
| 0.384 Ca$_2$SiO$_4$ = | −11.6 | or  0.433 CaSiO$_3$ = | −7.0 |
| 0.285 MgSiO$_3$ = | −4.0 | 0.236 MgSiO$_3$ = | −3.3 |

-continued

| 0.132 MgSiO$_3$ = | −0.9 | 0.334 CaO = | −4.4 |
| | −16.5 | 0.181 MgO = | −1.2 |
| | | | −15.9 |
| | or | 0.384 Ca$_2$SiO$_4$ = | −11.6 |
| | | 0.132 Mg$_2$SiO$_4$ = | −2.4 |
| | | 0.153 MgSiO$_3$ = | −2.1 |
| | | | −16.1 |

The applicants have found that when the free energy of hydration is more negative than −10 kcal/100 grams (−418.4 kJ/kg) of composition the composition showed high solubility. The compositions where this relationship broke down were those for which the total solubility was not available (for example those materials containing sodium, where any dissolved sodium would be swamped by the sodium in the saline solution) or where the free energy of hydration of the most likely species present was not available from the literature.

As a test of this technique the two examples of European Patent No. 0399320 were examined. The disclosed examples had the compositions:

| Component | Composition 1 Weight percent | Composition 2 Weight percent |
|---|---|---|
| SiO$_2$ | 60.7 | 58.5 |
| Al$_2$O$_3$ | — | 5.8 |
| CaO | 16.5 | 3.0 |
| MgO | 3.2 | — |
| B$_2$O$_3$ | 3.3 | 11.0 |
| Na$_2$O | 15.4 | 9.8 |
| K$_2$O | 0.7 | 2.9 |
| Iron oxide | 0.2 | 0.1 |
| BaO | — | 5.0 |
| ZnO | — | 3.9 |

Using the above method of calculation Composition 1 had a free energy of hydration of −11.6 kcal/100 grams (−485.3 kJ/kg) whereas Composition 2 had a free energy of hydration of −5.8 kcal/100 grams (−242.6 kJ/kg). This would suggest that Composition 1 would be a saline soluble fibre, and hence physiologically safer than an insoluble fibre; whereas Composition 2 would be predicted to be a relatively insoluble fibre and hence less safe. This is what is disclosed in EP 0399320, the fibres of Composition 2 having a longer lifetime in studies in which the fibres were introduced interperitoneally into rats.

As mentioned above this predictive test can fail under some circumstances. To avoid these difficulties the applicants looked to a different predictive technique, namely the assessment of the amount of non-bridging oxygens present. This is calculated by normalising the chemical analysis to 100 weight %; calculating the molar percentage of each oxide; summing the oxygen-weighted contribution of each oxide to get the total number of oxygens; summing the weighted contribution of each oxide of non-bridging oxygens (see below); and taking the ratio of non-bridging oxygens to the total number of oxygens. The applicants have found that when this figure exceeds 30% the fibres are soluble.

To explain the term non-bridging oxygen one must look to the structure of glasses. Glasses are very stiff liquids and to form usually require the presence of a material that can form a network (usually an oxygen-bridged network). The network may be modified by constituents that contribute non-bridging parts to the network and open the structure of the network and so prevent crystallisation. These materials are usually referred to as network-formers and modifiers respectively.

The terms modifier and network former are well known in the glass industries. Network formers are materials such as SiO$_2$, P$_2$O$_5$, B$_2$O$_3$ and GeO$_2$ which can form an interconnected network to form the glassy phase. Modifiers are substances such as CaO, Na$_2$O, and K$_2$O which alter the network and have effects on such properties as viscosity and melting point. There are some intermediate materials (such as Al$_2$O$_3$, TiO$_2$, PbO, ZnO and BeO) which can act as both network formers and modifiers depending on the environment and on the amount present.

In the above mentioned test, for calculating the non-bridging oxygens, one ignores the network formers and calculates the contribution of each other oxide. The contribution of each oxide depends on the geometry and charge of each cation in the glass. As examples typical contributions are as follows:

Ca$^{2+}$, Mg$^{2+}$, Sr$^{2+}$ and other divalent network modifier cations contribute 2 non-bridging oxygens K$^+$, Na$^+$ and other monovalent network modifier cations contribute 1 non-bridging oxygen Al$^{3+}$, Ti$^{3+}$ and other intermediate cations contribute −1 non-bridging oxygen (i.e these oxides reduce the number of non-bridging oxygens)

(Ti$^{4+}$ is reduced to Ti$^{3+}$ in most glasses when present in relatively small quantities)

TABLE 13

| Melt Code | Composition | | | | Oxygen | | | Solubility | | S.S.A | Normalized | Log (norm |
| | Oxide | Wt. % | Moles | Mol. % | Total | N.B.O. | % N.B.O | Oxide | (ppm) | m2/g | Solubility | solub) |
|---|---|---|---|---|---|---|---|---|---|---|---|---|
| CAS10(B) - A | CaO | 47.2 | 0.842 | 54.9 | 160.8 | 78.4 | 48.8 | CaO | 44 | 0.30 | 43 | 1.63 |
| | Al2O3 | 24.5 | 0.240 | 15.7 | | | | Al2O3 | 0 | | | |
| | SiO2 | 27.1 | 0.451 | 29.4 | | | | SiO2 | 7 | | | |
| | | Total | 1.533 | 100.0 | | | | Total | 51 | | | |
| CAS10(B) - B | CaO | 46.5 | 0.829 | 54.0 | 160.9 | 77.8 | 48.4 | CaO | 58 | 0.39 | 66 | 1.82 |
| | Al2O3 | 23.7 | 0.232 | 15.1 | | | | Al2O3 | 1 | | | |
| | SiO2 | 28.4 | 0.473 | 30.8 | | | | SiO2 | 44 | | | |
| | | Total | 1.534 | 100.0 | | | | Total | 103 | | | |
| CAS10(B) - C | CaO | 47.8 | 0.852 | 55.4 | 159.6 | 80.4 | 50.4 | CaO | 55 | 0.36 | 76 | 1.88 |
| | Al2O3 | 23.9 | 0.234 | 15.2 | | | | Al2O3 | 0 | | | |
| | SiO2 | 27.1 | 0.451 | 29.3 | | | | SiO2 | 55 | | | |

TABLE 13-continued

| | Composition | | | | Oxygen | | | Solubility | | S.S.A | Normalized | Log (norm |
|---|---|---|---|---|---|---|---|---|---|---|---|---|
| Melt Code | Oxide | Wt. % | Moles | Mol. % | Total | N.B.O. | % N.B.O | Oxide | (ppm) | m2/g | Solubility | solub) |
| CTS(A) | | Total | 1.537 | 100.0 | 152.5 | 85.1 | 55.8 | Total | 110 | 0.40 | 69 | 1.84 |
| | CaO | 42.7 | 0.761 | 47.5 | | | | CaO | 62 | | | |
| | TiO2 | 12.7 | 0.159 | 9.9 | | | | TiO2 | 0 | | | |
| | SiO2 | 41.0 | 0.682 | 42.6 | | | | SiO2 | 49 | | | |
| SrSiO3 | | Total | 1.602 | 100.0 | 148.8 | 102.4 | 68.8 | Total | 111 | 0.37 | 249 | 2.40 |
| | SrO | 63.1 | 0.609 | 51.2 | | | | SrO | 2 | | | |
| | SiO2 | 34.9 | 0.581 | 48.8 | | | | SiO2 | 367 | | | |
| | | Total | 1.190 | 100.0 | | | | Total | 369 | | | |
| CaSiO3 | CaO | 46.1 | 0.822 | 48.6 | 151.4 | 97.2 | 64.2 | CaO | 41 | 0.45 | 163 | 2.21 |
| | SiO2 | 52.3 | 0.870 | 51.4 | | | | SiO2 | 253 | | | |
| NAS(A) | | Total | 1.692 | 100.0 | 228.3 | −12.6 | −5.5 | Total | 294 | 0.56 | 4 | 0.60 |
| | Na2O | 18.8 | 0.303 | 22.0 | | | | Na2O | # | | | |
| | Al2O3 | 39.7 | 0.389 | 28.3 | | | | Al2O3 | 4 | | | |
| | SiO2 | 41.1 | 0.684 | 49.7 | | | | SiO2 | 5 | | | |
| CAS4 | | Total | 1.376 | 100.0 | 198.1 | 3.8 | 1.9 | Total | 9 | 0.62 | 8 | 0.90 |
| | CaO | 21.0 | 0.374 | 25.7 | | | | CaO | 11 | | | |
| | Al2O3 | 35.4 | 0.347 | 23.8 | | | | Al2O3 | 4 | | | |
| | SiO2 | 44.2 | 0.736 | 50.5 | | | | SiO2 | 5 | | | |
| MAS(B) | | Total | 1.457 | 100.0 | 205.6 | −11.2 | −5.4 | Total | 20 | 0.52 | 6 | 0.78 |
| | NgO | 10.0 | 0.248 | 17.0 | | | | MgO | 7 | | | |
| | Al2O3 | 33.7 | 0.311 | 22.6 | | | | Al2O3 | 2 | | | |
| | SiO2 | 53.0 | 0.882 | 60.4 | | | | SiO2 | 4 | | | |
| SAS(A) | | Total | 1.461 | 100.0 | 201.4 | −2.6 | −1.4 | Total | 13 | 0.50 | 8 | 0.90 |
| | SrO | 29.8 | 0.288 | 23.9 | | | | SrO | 9 | | | |
| | Al2O3 | 31.1 | 0.305 | 25.3 | | | | Al2O3 | 2 | | | |
| | SiO2 | 36.8 | 0.612 | 50.8 | | | | SiO2 | 5 | | | |
| SCS(A) | | Total | 1.205 | 100.0 | 150.5 | 99.0 | 65.8 | Total | 16 | 0.41 | 280 | 2.45 |
| | SrO | 35.0 | 0.338 | 23.5 | | | | SrO | 75 | | | |
| | CaO | 21.0 | 0.374 | 26.0 | | | | CaO | 30 | | | |
| | SiO2 | 43.6 | 0.726 | 50.5 | | | | SiO2 | 355 | | | |
| SMAS(A) | | Total | 1.438 | 100.0 | 169.6 | 60.8 | 35.8 | Total | 460 | 0.46 | 38 | 1.58 |
| | SrO | 55.0 | 0.531 | 49.1 | | | | SrO | 57 | | | |
| | MgO | 1.2 | 0.030 | 2.8 | | | | MgO | 5 | | | |
| | Al2O3 | 23.7 | 0.232 | 21.5 | | | | Al2O3 | 2 | | | |
| | SiO2 | 17.3 | 0.288 | 26.6 | | | | SiO2 | 5 | | | |
| SMAS(B) | | Total | 1.081 | 100.0 | 157.6 | 84.8 | 53.8 | Total | 69 | 0.39 | 95 | 1.98 |
| | SrO | 55.0 | 0.531 | 44.6 | | | | SrO | 110 | | | |
| | MgO | 4.8 | 0.119 | 10.0 | | | | MgO | 15 | | | |
| | Al2O3 | 14.8 | 0.145 | 12.2 | | | | Al2O3 | 1 | | | |
| | SiO2 | 23.7 | 0.394 | 33.2 | | | | SiO2 | 22 | | | |
| SMS(A) | | Total | 1.189 | 100.0 | 159.5 | 80.6 | 50.5 | Total | 148 | 0.39 | 212 | 2.33 |
| | SrO | 33.0 | 0.318 | 20.7 | | | | SrO | 147 | | | |
| | MgO | 12.5 | 0.310 | 20.2 | | | | MgO | 61 | | | |
| | Al2O3 | 1.0 | 0.010 | 0.6 | | | | Al2O3 | 0 | | | |
| | SiO2 | 53.8 | 0.895 | 58.4 | | | | SiO2 | 123 | | | |
| SAS(C) | | Total | 1.533 | 100.0 | 169.3 | 61.4 | 36.3 | Total | 331 | 0.38 | 52 | 1.72 |
| | SrO | 56.0 | 0.540 | 47.7 | | | | SrO | 70 | | | |
| | Al2O3 | 19.7 | 0.193 | 17.0 | | | | Al2O3 | 1 | | | |
| | SiO2 | 24.0 | 0.399 | 35.3 | | | | SiO2 | 8 | | | |
| CMAS(A) | | Total | 1.132 | 100.0 | 179.3 | 41.4 | 23.1 | Total | 79 | 0.30 | 24 | 1.38 |
| | CaO | 35.0 | 0.624 | 42.6 | | | | CaO | 11 | | | |
| | MgO | 4.5 | 0.112 | 7.6 | | | | MgO | 7 | | | |
| | Al2O3 | 44.0 | 0.432 | 29.5 | | | | Al2O3 | 3 | | | |
| | SiO2 | 17.8 | 0.296 | 20.3 | | | | SiO2 | 8 | | | |
| SWA2 | | Total | 1.464 | 100.0 | 157.5 | 85.0 | 54.0 | Total | 29 | 0.48 | 119 | 2.08 |
| | CaO | 21.1 | 0.387 | 21.4 | | | | CaO | 53 | | | |
| | MgO | 15.7 | 0.389 | 21.5 | | | | MgO | 57 | | | |
| | Al2O3 | 0.8 | 0.008 | 0.4 | | | | Al2O3 | 0 | | | |
| | SiO2 | 61.8 | 1.028 | 56.7 | | | | SiO2 | 118 | | | |
| | | Total | 1.812 | 100.0 | | | | Total | 228 | | | |

TABLE 13-continued

| Melt Code | Composition | | | | Oxygen | | | Solubility | | S.S.A | Normalized | Log (norm |
|---|---|---|---|---|---|---|---|---|---|---|---|---|
| | Oxide | Wt. % | Moles | Mol. % | Total | N.B.O. | % N.B.O | Oxide | (ppm) | m2/g | Solubility | solub) |
| SAS(D) | SrO | 56.5 | 0.545 | 48.5 | 166.9 | 66.2 | 39.7 | SrO | 107 | 0.40 | 92 | 1.96 |
| | Al2O3 | 17.6 | 0.173 | 15.4 | | | | Al2O3 | 1 | | | |
| | SiO2 | 24.4 | 0.406 | 36.1 | | | | SiO2 | 39 | | | |
| | Total | | 1.124 | 100.0 | | | | Total | 147 | | | |
| KMAS(A) | K2O | 16.5 | 0.175 | 11.3 | 179.5 | 41.4 | 23.1 | K2O | # | 0.36 | 14 | 1.15 |
| | MgO | 13.0 | 0.323 | 20.8 | | | | MgO | 8 | | | |
| | Al2O3 | 18.0 | 0.177 | 11.4 | | | | Al2O3 | 1 | | | |
| | SiO2 | 52.8 | 0.879 | 56.6 | | | | SiO2 | 11 | | | |
| | Total | | 1.554 | 100.0 | | | | Total | 20 | | | |

Figure 5:
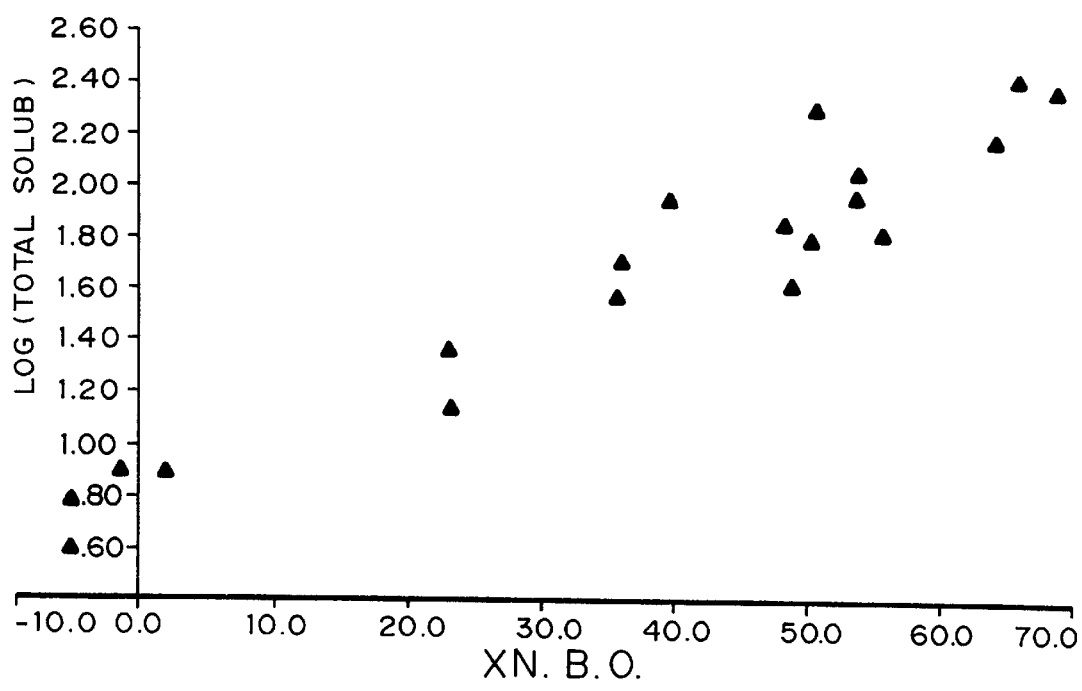
FIG. 5 is a plot of log (total solubility) v % non-bonding oxygens for a series of fibres (see below).

Table 13 shows, for the compositions of Table 11, the calculated figure for non-bonding oxygens and these figures are reproduced in FIG. 5. It can be seen that the plot of FIG. 5 is more linear than that of FIG. 4. Compositions with greater than 30% non-bridging oxygens show high solubility.

To illustrate the method the calculation for one example (the first shown in Table 13) is given below:

| | Mols/Mol | Total Oxygen | | Non-bridging Oxygens | |
|---|---|---|---|---|---|
| CaO | 0.549 | 0.549 | | 1.098 | (2*0.549) |
| Al$_2$O$_3$ | 0.157 | 0.471 | (0.157*3) | −0.314 | (−1*0.157*2A1) |
| SiO$_2$ | 0.294 | 0.588 | | 0.000 | |
| | 1.000 | 1.608 | | 0.784 | |

% non-bridging oxygens (0.784/1.608)*100 = 48.8%

As an example one can look to European Patent Specification No. 0399320 referred to above. Using this method in relation to that specification Composition 1 has a non-bridging oxygen percentage of 48.2% whereas Composition 2 has a non-bridging oxygen percentage of 19.6%, again predicting that Composition 1 is more soluble than Composition 2.

There is a further criterion which a composition must meet for it to form vitreous fibres, namely that it be capable of forming a glass. The applicants have found a simple test. If the ratio of modifiers to network formers is less than a critical value (for SiO$_2$ based glasses, 1) the composition will generally form a glass. For the purpose of this test reasonable results are obtained if such intermediate materials are treated as networkers. Table 14 shows for a series of compositions in each column:

Fibre reference (N.B. these are not the same fibres as shown in tables 9 & 10)
Composition
Molar ratios
Ratio of glass modifiers to network formers
Free energy of hydration of raw oxides
Melting Point
X-ray diffraction results
Solubility data (# indicates not measured)
Specific surface area
Normalised solubility data
Arbitrary ranking as to solubility and glass forming ability
Indication as to whether melting point above 1500° C.

It should be emphasised that this test is a screening one rather than a wholly predictive one as there are several circumstances that may lead to its failure. Among these circumstances are compound formation and inability to quench fast enough to form glass.

Having adopted these tests as a screening method there follows a further step to ascertain whether the composition will form a vitreous fibre. This last step is best examined experimentally as fibre forming ability is a complex function of many physical characteristics, e.g. viscosity, which are often difficult to measure.

| Key to FIG. 1 | | | |
|---|---|---|---|
| CR | Cristobalite | FO | Forsterite |
| TR | Tridymite | PR | Protoenstatite |
| PS | Pseudowollastonite | DI | Diopside |
| WO | Wollastonite | AK | Akermanite |
| RA | Rankinite | ME | Merwinite |
| LI | Lime | MO | Monticellite |
| PE | Periclase | | |

TABLE 14

| Reference | Composition (Wt. %) | Molar Ratios | Modifier/ Networker | Ghyd (kcal/mol) | M. Pt. (C.) | % RD Data | Species | Solubility Data (ppm) 1 day | Total | 5 days | Total | S.S.A. (m2/g) | Norm Solub (0.25 m2/g) 1 day | 5 days | Criteria (0–10 Rating) Solub | Glass | M. Pt >1500 C. |
|---|---|---|---|---|---|---|---|---|---|---|---|---|---|---|---|---|---|
| CAS10(A) No. 18 | 49.4 CaO 23.4 Al2O3 29.2 SiO2 | 3.8 CaO 1.0 Al2O3 1.9 SiO2 | 0.97 | -4.6 | 1544 (Eut.) | Amorphous * trace (3 small peaks) | CaO Al2O3 SiO2 | 62 7 55 | 124 | 48 10 124 | 182 | 0.25 | 124 | 187 | 10 | 9 | T |
| CIS(A) No. 19 | 42.7 CaO 13.0 TiO2 43.6 SiO2 | 4.7 CaO 1.0 TiO2 4.5 SiO2 | 0.85 | -1.3 | 1425 (Eut.) | Amorphous (No peaks) | CaO TiO2 SiO2 | 100 0 87 | 187 | 88 0 109 | 197 | 0.56 | 83 | 88 | 7 | 10 | W |
| MAS(A) No. 20 | 12.4 MgO 26.5 Al2O3 62.4 SiO2 | 1.2 MgO 1.0 Al2O3 4.0 SiO2 | 0.2 | 3.8 | 1450 (1400 C.) | Amorphous * trace (2 small peaks) | MgO Al2O3 SiO2 | 63 5 24 | 92 | 248 1 15 | 264 | 0.57 | 40 | 116 | 4 | 9 | W |
| MAS(A) No. 21 | 29.4 Na2O 39.2 Al2O3 33.7 SiO2 | 1.2 Na2O 1.0 Al2O3 1.5 SiO2 | 0.69 | -6.3 | 1475 (Eut.) | Crystalline (Glossy trace) | Na2O Al2O3 SiO2 | # 3 29 | 37 | # 983 15 | 990 | 0.53 | 15 | 471 | 1 | 2 | W |
| CPI(A) No. 22 | 53.3 CaO 50.6 P2O5 | 2.7 CaO 1.0 P2O5 | 1.35 | -24.7 | 1565 (Eut.) | Crystalline (No glass) | CaO P2O5 | 47 # | 47 | 17 # | 17 | 0.68 | 17 | 6 | 1 | 0 | T |
| SAI(B) No. 23 | 68.0 SiO 35.9 SiO2 | 1.1 SiO 1.0 SiO2 | 1.1 | -5.7 | 1545 (Eut.) | Amorphous (strong) * some crystal. (strong) | SiO SiO2 | 11 1236 | 1247 | 5 724 | 729 | 0.88 | 346 | 203 | 10 | 5 | T |
| CaSiO3 No. 24 | 42.3 CaO 57.2 SiO2 | 1.0 CaO 1.3 SiO2 | 0.77 | -3 | 1545 (1460 C.) | Amorphous * trace (3 small peaks) | CaO SiO2 | 19 1265 | 1284 | 27 481 | 508 | 0.71 | 452 | 179 | 10 | 9 | W |
| ASI(D) No. 26 | 37.3 MgO 62.5 SiO2 | 1.0 MgO 1.1 SiO2 | 0.91 | 0.6 | 1545 (Eut.) | Crystalline (strong) * some glass (strong) | MgO SiO2 | 62 154 | 216 | 249 113 | 362 | 0.83 | 65 | 127 | 5 | 6 | T |
| C612A17 | 47.7 CaO 53.9 Al2O3 | 11.2 CaO 7.0 Al2O3 | 0.8 | -7.2 | 1400 (Eut.) | Amorphous * trace (Mod. cryst.) | CaO Al2O3 | 14 298 | 317 | 3 142 | 145 | 2.45 | 37 | 15 | 3 | 7 | W |
| CMS(A) No. 27 | 42.5 CaO 16.6 MgO 39.7 SiO2 | 1.8 CaO 1.0 MgO 1.4 SiO2 | 7 | -4.3 | 1575 (Eut.) | Crystalline (No glass) | CaO MgO SiO2 | 42 41 220 | 303 | 21 8 198 | 227 | 0.47 | 158 | 118 | 10 | 0 | T |
| CTI(D) No. 25 | 15.4 CaO 77.5 TiO2 | 1.0 CaO 3.5 TiO2 | 4.570 | 9.5 | 1465 (Eut.) | Crystalline (No glass) | CaO TiO2 | 14 0 | 14 | 16 0 | 16 | 1.15 | 3 | 3 | 0 | 0 | W |
| NCS(A) Cryst. No. 29 | 20.4 Na2O 35.8 CaO 40.8 SiO2 | 1.0 Na2O 1.9 CaO 2.1 SiO2 | 1.86 | -8.7 | 1425 (Eut.) | Crystalline * some glass (Strong cryst.) | Na2O CaO SiO2 | # 595 211 | 806 | # 333 42 | 375 | 0.99 | 204 | 95 | 10 | 4 | W |
| NCS(A) Glassy No. 30 | 19.5 Na2O 35.3 CaO 42.7 SiO2 | 1.0 Na2O 2.0 CaO 2.3 SiO2 | 1.74 | -8.1 | 1425 (Eut.) | Amorphous * some crystal. (8 small peaks) | Na2O CaO SiO2 | # 543 143 | 686 | # 237 34 | 271 | 1.36 | 123 | 49 | 10 | 7 | W |
| CPI(A)Rpt No. 31 | 54.4 CaO 48.2 P2O5 | 2.9 CaO 1.0 P2O5 | 1.45 | -24 | 1565 (Eut.) | Crystalline (No glass) | CaO P2O5 | 14 # | 14 | 13 # | 13 | 1.04 | 3 | 3 | 0 | 0 | T |
| NAS(A) No. 32 | 21.0 Na2O 40.1 Al2O3 38.7 SiO2 | 1.0 Na2O 1.2 Al2O3 1.8 SiO2 | 0.48 | -4 | 1475 (Eut.) | Amorphous (No peaks) | Na2O Al2O3 SiO2 | # 18 19 | 37 | # 30 20 | 50 | 0.53 | 17 | 24 | 1 | 4 | W |
| Apt. KAS(E) No. 33 | 20.0 K2O 30.4 Al2O3 46.1 SiO2 | 1.0 K2O 1.4 Al2O3 3.6 SiO2 | 0.31 | -2.7 | 1590 (Eut.) | Amorphous (No peaks) | K2O Al2O3 SiO2 | # 9 19 | 28 | # 18 21 | 39 | 0.97 | 7 | 10 | 1 | 10 | T |
| CAS4 No. 34 | 21.2 CaO 34.0 Al2O3 44.6 SiO2 | 1.1 CaO 1.0 Al2O3 2.2 SiO2 | 0.26 | 1.1 | 1550 (1500 C.) | Amorphous (No peaks) | CaO Al2O3 SiO2 | 17 1 10 | 28 | 13 1 10 | 24 | 0.72 | 10 | 8 | 1 | 10 | T |

TABLE 14-continued

| Reference | Composition (Wt. %) | Molar Ratios | Modifier/ Networker | Ghyd (kcal/mol) | M. Pt. (C.) | % RD Data | Species | Solubility Data (ppm) 1 day | Total | 5 days | Total | S.S.A. (m2/g) | Norm Solub (0.25 m2/g) 1 day | 5 days | Criteria (0–10 Rating) Solub | Glass | M. Pt >1500 C. |
|---|---|---|---|---|---|---|---|---|---|---|---|---|---|---|---|---|---|
| NAS(D) No. 35 | 14.9 MgO 35.9 Al2O3 51.6 SiO2 | 2.7 MgO 2.0 Al2O3 4.9 SiO2 | 0.24 | 3.4 | 1450 (1400 C.) | Amorphous (No peaks) | MgO Al2O3 SiO2 | 7 1 7 | 15 | 68 24 20 | 107 | 0.61 | 6 | 42 | 1 | 10 | W |
| SAS(A) No. 36 | 32.5 SiO 32.4 Al2O3 38.1 SiO2 | 1.0 SiO 1.0 Al2O3 2.0 SiO2 | 0.25 | 0.1 | 1670 (?) | Amorphous (No peaks) | SiO Al2O3 SiO2 | 24 11 15 | 50 | 1 1 10 | 12 | 0.67 | 19 | 4 | 2 | 10 | T |
| SCS(A) No. 37 | 17.1 SiO 17.5 CaO 43.4 SiO2 | 1.1 SiO 1.0 CaO 2.3 SiO2 | 0.91 | −3.6 | 1480 (Eut) | Amorphous * trace (2 small peaks) | SiO CaO SiO2 | 57 35 329 | 411 | 3 2 594 | 599 | 0.57 | 177 | 258 | 10 | 10 | W |
| SCS(C) No. 38 | 19.5 SiO 29.4 CaO 47.1 SiO2 | 0.5 SiO 1.4 CaO 2.1 SiO2 | 0.9 | −3.1 | 1500 (Eut.) | Amorphous (No peaks) | SiO CaO SiO2 | 55 36 320 | 411 | 11 10 558 | 579 | 0.66 | 155 | 219 | 10 | 10 | T |
| SCS(B) No. 39 | 51.4 SiO 8.1 CaO 39.7 SiO2 | 1.7 SiO 0.5 CaO 2.3 SiO2 | 0.96 | −4.6 | 1500 (Eut.) | Amorphous * trace (1 small peak) | SiO CaO SiO2 | 5 5 415 | 425 | 45 27 507 | 579 | 0.66 | 161 | 219 | 10 | 10 | T |
| SAS(B) No. 40 | 65.9 SiO 12.4 Al2O3 25.0 SiO2 | 5.2 SiO 1.0 Al2O3 3.4 SiO2 | 0.96 | −6.6 | 1600 (?) | Crystalline (strong) * some glass (strong) | SiO Al2O3 SiO2 | 102 1 350 | 453 | 5 1 250 | 256 | 0.99 | 114 | 65 | 10 | 5 | T |
| SMAS(A) No. 41 | 58.0 SiO 1.1 MgO 25.8 Al2O3 18.4 SiO2 | 2.7 SiO 0.1 MgO 0.9 Al2O3 1.1 SiO2 | 0.76 | −6.7 | 1610 (1560 C.) | Amorphous * trace (1 small peak) | SiO MgO Al2O3 SiO2 | 87 7 1 9 | 104 | 61 4 1 15 | 81 | 0.65 | 48 | 31 | 4 | 10 | T |
| SMAS(B) No. 42 | 59.1 SiO 3.8 MgO 16.6 Al2O3 24.6 SiO2 | 6.0 SiO 1.0 MgO 1.7 Al2O3 4.3 SiO2 | 0.91 | −5.8 | 1610 (1500 C.) | Amorphous * trace (3 small peaks) | SiO MgO Al2O3 SiO2 | 123 32 1 41 | 197 | 20 29 1 36 | 86 | 0.7 | 70 | 31 | 6 | 9 | T |
| SMS(A) No. 43 | 35.9 SiO 0.8 Al2O3 12.9 MgO 51.2 SiO2 | 1.1 SiO 2.7 MgO 2.7 SiO2 | 0.78 | −0.4 | 1600 (1500 C.) | Amorphous (No peaks) | SiO MgO SiO2 | 159 100 185 | 444 | 42 129 177 | 348 | 0.75 | 148 | 176 | 10 | 10 | T |
| SAS(C) No. 44 | 60.6 SiO 20.7 Al2O3 22.6 SiO2 | 2.9 SiO 1.0 Al2O3 1.9 SiO2 | 0.74 | −5.9 | 1600 (?) | Amorphous (No peaks) | SiO Al2O3 SiO2 | 142 7 18 | 167 | 104 7 22 | 133 | 0.67 | 67 | 50 | 5 | 10 | T |
| ACPS(A) No. 45 | 16.6 Al2O3 39.0 CaO 35.6 P2O5 6.7 SiO2 | 1.5 Al2O3 6.2 CaO 2.2 P2O5 1.0 SiO2 | 0.74 | −17.7 | 1600 (Eut) | Crystalline (No glass) | Al2O3 CaO P2O5 SiO2 | 1 39 # 6 | 46 | 1 35 # 9 | 45 | 0.58 | 20 | 19 | 2 | 0 | T |
| CMAS(A) No. 46 | 30.6 CaO 5.9 MgO 41.6 Al2O3 19.6 SiO2 | 3.7 CaO 1.0 MgO 2.8 Al2O3 2.2 SiO2 | 0.6 | −3.2 | 1530 (Eut) | Amorphous (No peaks) | CaO MgO Al2O3 SiO2 | 24 10 2 4 | 40 | 21 7 2 9 | 39 | 0.54 | 19 | 18 | 2 | 10 | T |

TABLE 14-continued

| Reference | Composition (Wt. %) | Molar Ratios | Modifier/ Networker | Ghyd (kcal/mol) | M. Pt. (C.) | % RD Data | Solubility Data (ppm) Species | 1 day | Total | 5 days | Total | S.S.A. (m2/g) | Norm Solub (0.25 m2/g) 1 day | 5 days | Criteria (0-10 Rating) Solub | Glass | M. Pt >1500 C. |
|---|---|---|---|---|---|---|---|---|---|---|---|---|---|---|---|---|---|
| SA No. 47 | 69.1 SiO 32.2 Al2O3 | 2.1 SiO 1.0 Al2O3 | 1.05 | −10.7 | 1500 (Eut) | Crystalline (strong) * some glass (med) | SiO Al2O3 | 49 1106 | 1155 | 125 1132 | 1257 | 0.62 | 466 | 507 | 10 | 4 | T |
| SW2A No. 48 | 21.3 CaO 16.9 MgO 1.1 Al2O3 61.5 SiO2 | 1.0 CaO 1.1 MgO 2.7 SiO2 | 0.78 | −0.2 | 1360 | Amorphous (No peaks) | CaO MgO Al2O3 SiO2 | 70 91 10 151 | 322 | 65 116 1 187 | 369 | 0.66 | 127 | 140 | 10 | 10 | W |
| MAS(C) No. 49 | 34.9 MgO 25.5 Al2O3 41.7 SiO2 | 3.5 MgO 1.0 Al2O3 2.3 SiO2 | 0.73 | 0 | 1600 (Eut) | Amorphous (strong) * some cryst. (weak) | MgO Al2O3 SiO2 | 50 2 7 | 58 | 135 2 7 | 144 | 0.52 | 27 | 67 | 2 | 7 | T |
| SAS(D) No. 50 | 60.3 SiO 16.5 Al2O3 22.4 SiO2 | 3.6 SiO 1.0 Al2O3 2.3 SiO2 | 0.84 | −6.1 | 1600 (?) | Amorphous * trace (2 peaks) | SiO Al2O3 SiO2 | 141 1 118 | 260 | 77 1 171 | 249 | 0.54 | 123 | 117 | 10 | 10 | T |
| KMAS(A) No. 51 | 17.5 K2O 13.5 MgO 18.6 Al2O3 53.1 SiO2 | 1.0 K2O 1.8 MgO 1.0 Al2O3 4.8 SiO2 | 0.56 | −2.4 | 1500 (Eut) | Amorphous (No peaks) | K2O MgO Al2O3 SiO2 | # 13 1 9 | 23 | # 14 1 10 | 25 | 0.94 | 6 | 7 | 1 | 10 | T |
| KMAS(A) No. 52 | 20.0 K2O 9.0 Na2O 33.8 Al2O3 39.9 SiO2 | 1.5 K2O 1.0 Na2O 2.3 Al2O3 4.6 SiO2 | 0.54 | −6.3 | 1590 (Eut) | Amorphous (No peaks) | K2O Na2O Al2O3 SiO2 | # # 14 17 | 31 | # # 32 17 | 49 | 0.63 | 17 19 | 1 | 10 | T | |

We claim:

1. A method of insulating an article comprising:

(A) disposing on, in, near, or around the article thermal insulation which is a refractory insulating material having a maximum service temperature greater than 900° C. and comprising vitreous fibers having a composition comprising $SiO_2$, CaO, MgO, and optionally $Al_2O_3$, wherein:

(a) $SiO_2$ is present in an amount less than or equal to 71.24 percent by weight and (1) greater than 58% by weight $SiO_2$, if the amount of MgO in the composition is in the range 0 through 10 percent by weight; or (2) greater than the sum of (58+0.5(weight percent of MgO—10)) percent by weight $SiO_2$, if the amount of MgO in the composition is greater than 10 percent by weight;

(b) greater than 0 and less than or equal to 42 percent by weight CaO;

(c) greater than 0 and less than or equal to 31.33 percent by weight MgO; and (d) 0 to less than 3.97 percent by weight $Al_2O_3$;

wherein:

the refractory insulation material has a maximum service temperature greater than 900° C.;

the refractory insulation material has a shrinkage of less than 3.5 percent when exposed to a temperature of 1000° C. for 24 hours, and has a shrinkage of less than 3.5 percent when exposed to a temperature of 800° C. for 24 hours; and wherein the refractory insulation material is essentially free of alkali metal oxide and boron oxide fluxing components; and (B) exposing said insulated article to a temperature above around 900° C. for 24 hours.

2. The method of claim 1, further comprising exposing said insulated article to a temperature above around 1000° C.

3. The method of claim 1, wherein the amount of $SiO_2$ is less than 70 percent by weight.

4. The method of claim 1, wherein the vitreous fibers crystallize as wollastonite, pseudowollastonite, or a mixture thereof after exposure to a temperature of 1000° C., and have the composition comprising:

(a) 60 through 67 percent by weight $SiO_2$;

(b) 26 through 35 percent by weight CaO;

(c) 4 through 6 percent by weight MgO; and (d) 0 through 3.5 percent by weight $Al_2O_3$.

5. The method of claim 1, wherein the vitreous fibers comprise:

(a) a maximum of 71.24 percent by weight $SiO_2$;

(b) 4.46 through 34.49 percent by weight CaO;

(c) 1.71 through 22.31 percent by weight MgO; and (d) 0 through 2.57 percent by weight $Al_2O_3$.

6. The method of claim 5, wherein the vitreous fibers further comprise:

(e) 0 through 0.65 percent by weight $Na_2O$;

(f) 0 through 0.13 percent by weight $K_2O$;

(g) 0.08 through 0.4 percent by weight $Fe_2O_3$; and (h) 0 through 1.23 percent by weight $ZrO_2$.

7. The method of claim 1, further comprising forming said vitreous fibers into a bulk, blanket, block, or vacuum-formed form.

8. The method of claim 7, wherein said vitreous fibers are formed into a needled blanket.

9. The method of claim 1, wherein the vitreous fibers crystallize as diopside after exposure to a temperature of 1000° C., and have the composition comprising:

(a) 60 through 64 percent by weight $SiO_2$;

(b) 19 through 23 percent by weight CaO;

(c) 14 through 17 percent by weight MgO; and (d) 0 through 3.5 percent by weight $Al_2O_3$.

* * * * *

UNITED STATES PATENT AND TRADEMARK OFFICE
CERTIFICATE OF CORRECTION

PATENT NO. : 5,994,247
DATED : November 30, 1999
INVENTOR(S) : Gary Anthony Jubb and Jean-Louis Martin It is certified that error appears in the above-identified patent and that said Letters Patent is hereby corrected as shown below:

Column 5,
Line 30, Table 1, column entitled "SiO2", delete the first figure "59.2" and add -- 59.3 --

Signed and Sealed this

Twenty-ninth Day of January, 2002

Attest:

JAMES E. ROGAN
Attesting Officer
Director of the United States Patent and Trademark Office